(12) United States Patent
Hoff et al.

(10) Patent No.: US 8,856,770 B2
(45) Date of Patent: Oct. 7, 2014

(54) SOLUTION PACKAGES INCLUDING SEGMENTS OF A PROCESS CHAIN

(75) Inventors: Roland Hoff, Walldorf (DE); Bernhard Hartenstein, Angelbachtal (DE)

(73) Assignee: SAP AG, Walldorf (DE)

( * ) Notice: Subject to any disclaimer, the term of this patent is extended or adjusted under 35 U.S.C. 154(b) by 987 days.

(21) Appl. No.: 12/884,912

(22) Filed: Sep. 17, 2010

(65) Prior Publication Data

US 2012/0072250 A1 Mar. 22, 2012

(51) Int. Cl.
- G06F 9/44 (2006.01)
- G06F 9/45 (2006.01)
- G06Q 10/00 (2012.01)
- G06Q 10/06 (2012.01)

(52) U.S. Cl.
CPC .................................. *G06Q 10/06* (2013.01); *G06Q 10/063* (2013.01)
USPC ........... 717/168; 717/101; 717/169; 717/173; 705/7.27

(58) Field of Classification Search
CPC ..................................................... G06Q 10/06
See application file for complete search history.

(56) References Cited

U.S. PATENT DOCUMENTS

| | | | | |
|---|---|---|---|---|
| 5,930,512 | A * | 7/1999 | Boden et al. | 717/102 |
| 6,662,199 | B1 | 12/2003 | Flight et al. | |
| 7,403,948 | B2 * | 7/2008 | Ghoneimy et al. | 707/792 |
| 7,945,907 | B2 * | 5/2011 | Dreiling et al. | 717/168 |
| 8,275,647 | B2 * | 9/2012 | Anisimov et al. | 705/7.27 |
| 8,650,533 | B2 | 2/2014 | Hoff | |
| 8,799,851 | B2 | 8/2014 | Hoff | |
| 2002/0091560 | A1 * | 7/2002 | Suzuki et al. | 705/9 |
| 2002/0178252 | A1 * | 11/2002 | Balabhadrapatruni et al. | 709/223 |
| 2003/0037324 | A1 * | 2/2003 | Kong et al. | 717/173 |
| 2003/0177046 | A1 * | 9/2003 | Socha-Leialoha | 705/7 |
| 2004/0268338 | A1 * | 12/2004 | Gurpinar et al. | 717/169 |
| 2006/0005162 | A1 | 1/2006 | Tseng et al. | |
| 2006/0070025 | A1 * | 3/2006 | Mauceri et al. | 717/106 |
| 2006/0123414 | A1 | 6/2006 | Fors et al. | |
| 2006/0143591 | A1 * | 6/2006 | Hilerio et al. | 717/101 |
| 2008/0021754 | A1 | 1/2008 | Horn et al. | |
| 2008/0040191 | A1 * | 2/2008 | Chakravarty et al. | 705/9 |
| 2008/0052613 | A1 * | 2/2008 | Maine | 715/222 |

(Continued)

OTHER PUBLICATIONS

Georgios John Fakas et al., "A peer to peer (P2P) architecture for dynamic workflow management," [Online], 2003, pp. 423-431, [Retrieved from Internet on Jul. 24, 2014], <http://pdf.aminer.org/000/370/573/a_peer_to_peer_p_p_dynamic_workflow_management_system.pdf>.*

(Continued)

*Primary Examiner* — Thuy Dao
*Assistant Examiner* — Ziaul A Chowdhury
(74) *Attorney, Agent, or Firm* — Brake Hughes Bellermann LLP

(57) ABSTRACT

In one general aspect, a computer system can include an existing process chain module configured to receive a plurality of segment definitions representing a plurality of existing segments defining an existing process chain implemented in a target system. The computer system can include a proposed process chain module configured to select, based on the plurality of segment definitions, a proposed process chain including a first proposed segment corresponding with an existing segment from the plurality of existing segments, and including a second proposed segment different from each existing segment from the plurality of existing segments. The computer system can include an operational relationship module configured to define an option for an operational relationship between the existing segment from the plurality of existing segments and the second proposed segment of the proposed process chain.

20 Claims, 12 Drawing Sheets

(56) References Cited

U.S. PATENT DOCUMENTS

| | | | |
|---|---|---|---|
| 2008/0155431 A1 | 6/2008 | Bombolowsky | |
| 2008/0271008 A1* | 10/2008 | Dettori et al. | 717/168 |
| 2009/0044185 A1* | 2/2009 | Krivopaltsev | 717/173 |
| 2009/0282417 A1* | 11/2009 | Yoshida | 718/104 |
| 2010/0043002 A1* | 2/2010 | Fujiwara | 718/102 |
| 2012/0180035 A1* | 7/2012 | Poddar et al. | 717/168 |
| 2012/0185587 A1 | 7/2012 | O'Sullivan et al. | |

OTHER PUBLICATIONS

Raul Medina-Mora et al. "The Action Workflow Approch to Workflow Management Technology" [Online], ACM 1992, pp. 281-288, [Retrieved from Internet on Jul. 24, 2014], <http://cos.ufrj.br/~jano/CSCW2004/medina-mora_1992.pdf>.*

Sarita Bassil et al., "A Workflow-Oriented System Architecture for the Management of Container Transportation", [Online], Springer 2004, pp. 1-16, [Retrieved from Internet on Jul. 24, 2014], <http://www.iro.umontreal.ca/~keller/Publications/Papers/2004/bpm-2004.pdf>.*

Gregor Joeris et al., "Managing Evolving Workflow Specifications", [Online], IEEE 1998, pp. 1-10, [Retrieved from Internet on Jul. 24, 2014], <http://ieeexplore.ieee.org/stamp/stamp.jsp?tp=&arnumber=706275>.*

Non-Final Office Action for U.S. Appl. No. 12/884,857, mailed Apr. 24, 2013, 23 pages.

Final Office Action for U.S. Appl. No. 12/884,881, mailed Apr. 24, 2013, 15 pages.

Non-Final Office Action Response for U.S. Appl. No. 12/884,881, filed Dec. 28, 2012, 13 pages.

Advisory Office Action for U.S. Appl. No. 12/884,881, mailed Jul. 24, 2013, 3 pages.

Final Office Action Response for U.S. Appl. No. 12/884,881, filed Jul. 1, 2013, 12 pages.

Non-Final Office Action for U.S. Appl. No. 12/884,881, mailed Oct. 2, 2012, 15 pages.

Notice of Allowance for U.S. Appl. No. 12/884,857, mailed Oct. 1, 2013, 6 pages.

"SAP Modeling Handbook—Modeling Standards", Process Hierarchy—SAP Community Network Wiki, retrieved on Jul. 21, 2010 from http://wiki.sdn.sap.com, 4 pages.

Gschwind, T., et al, "Applying Patterns during Business Process Modeling", BPM 2008, LNCS vol. 5240, 2008, pp. 4-19.

Reichert, M., et al, "Extending a Business Process Modeling Tool with Process Configuration Facilities: The Provop Demonstrator", In: CEUR proceedings of the BPM '09 Demonstration Track, Business Process Management Conference 2009 (BPM'09), Sep. 2009, Ulm, Germany, 5 pages.

Notice of Allowance for U.S. Appl. No. 12/884,881, mailed Jun. 17, 2014, 5 pages.

Notice of Allowance for U.S. Appl. No. 12/884,881, mailed May 7, 2014, 8 pages.

\* cited by examiner

SOLUTION PACKAGES INCLUDING SEGMENTS OF A PROCESS CHAIN

TECHNICAL FIELD

This description relates to solution packages for process chains implemented on a computer system.

BACKGROUND

Some known enterprise software packages include numerous features that are intended to meet the needs of a variety of users. In some computer systems, these known enterprise software packages may include at least some features, and/or upgrades to these features, that can needlessly consume computing resources and/or that are dispersed throughout portions of the enterprise software packages. In some instances, the features that are available within the enterprise software package may not even meet the specific needs of a user of the computer system. In addition, the features of the enterprise software package may cause inconveniences during initial installation and/or upgrading of the enterprise software package that may not be desirable to some users. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include an existing process chain module configured to receive a plurality of segment definitions representing a plurality of existing segments defining an existing process chain implemented in a target system. The computer system can include a proposed process chain module configured to select, based on the plurality of segment definitions, a first proposed process chain including a first proposed segment corresponding with an existing segment from the plurality of existing segments, and including a second proposed segment different from each existing segment from the plurality of existing segments, and configured to select, based on the plurality of segment definitions, a second proposed process chain including a first proposed segment corresponding with the existing segment from the plurality of existing segments, and including a second proposed segment different from each existing segment from the plurality of existing segments. The computer system can include an operational relationship module configured to define an option for an operational relationship between the existing segment from the plurality of existing segments and the second proposed segment of the first proposed process chain, and configured to define a prerequisite for an operational relationship between the existing segment from the plurality of existing segments and the second proposed segment of the second proposed process chain.

In another general aspect, a non-transitory computer-readable storage medium storing code representing instructions that when executed are configured to cause a processor to perform a process. The code can include code to receive a plurality of segment definitions representing a plurality of existing segments defining an existing process chain implemented in a target system. The code can include code to select, based on the plurality of segment definitions, a first proposed process chain including a first proposed segment corresponding with an existing segment from the plurality of existing segments, and including a second proposed segment different from each existing segment from the plurality of existing segments, and code to select, based on the plurality of segment definitions, a second proposed process chain including a first proposed segment corresponding with the existing segment from the plurality of existing segments, and including a second proposed segment different from each existing segment from the plurality of existing segments. The code can also include code to define an option for an operational relationship between the existing segment from the plurality of existing segments and the second proposed segment of the first proposed process chain, and code to define a prerequisite for an operational relationship between the existing segment from the plurality of existing segments and the second proposed segment of the second proposed process chain.

In yet another general aspect, a method can include executing instructions recorded on a non-transitory computer-readable storage media using at least one processor. The method can also include receiving a plurality of segment definitions representing a plurality of existing segments defining an existing process chain implemented in a target system. The method can include selecting, based on the plurality of segment definitions, a first proposed process chain including a first proposed segment corresponding with an existing segment from the plurality of existing segments, and including a second proposed segment different from each existing segment from the plurality of existing segments, and the method can include selecting, based on the plurality of segment definitions, a second proposed process chain including a first proposed segment corresponding with the existing segment from the plurality of existing segments, and including a second proposed segment different from each existing segment from the plurality of existing segments. The method can also include defining an option for an operational relationship between the existing segment from the plurality of existing segments and the second proposed segment of the first proposed process chain, and defining a prerequisite for an operational relationship between the existing segment from the plurality of existing segments and the second proposed segment of the second proposed process chain.

The details of one or more implementations are set forth in the accompanying drawings and the description below. Other features will be apparent from the description and drawings, and from the claims.

DETAILED DESCRIPTION

Figure 1A:
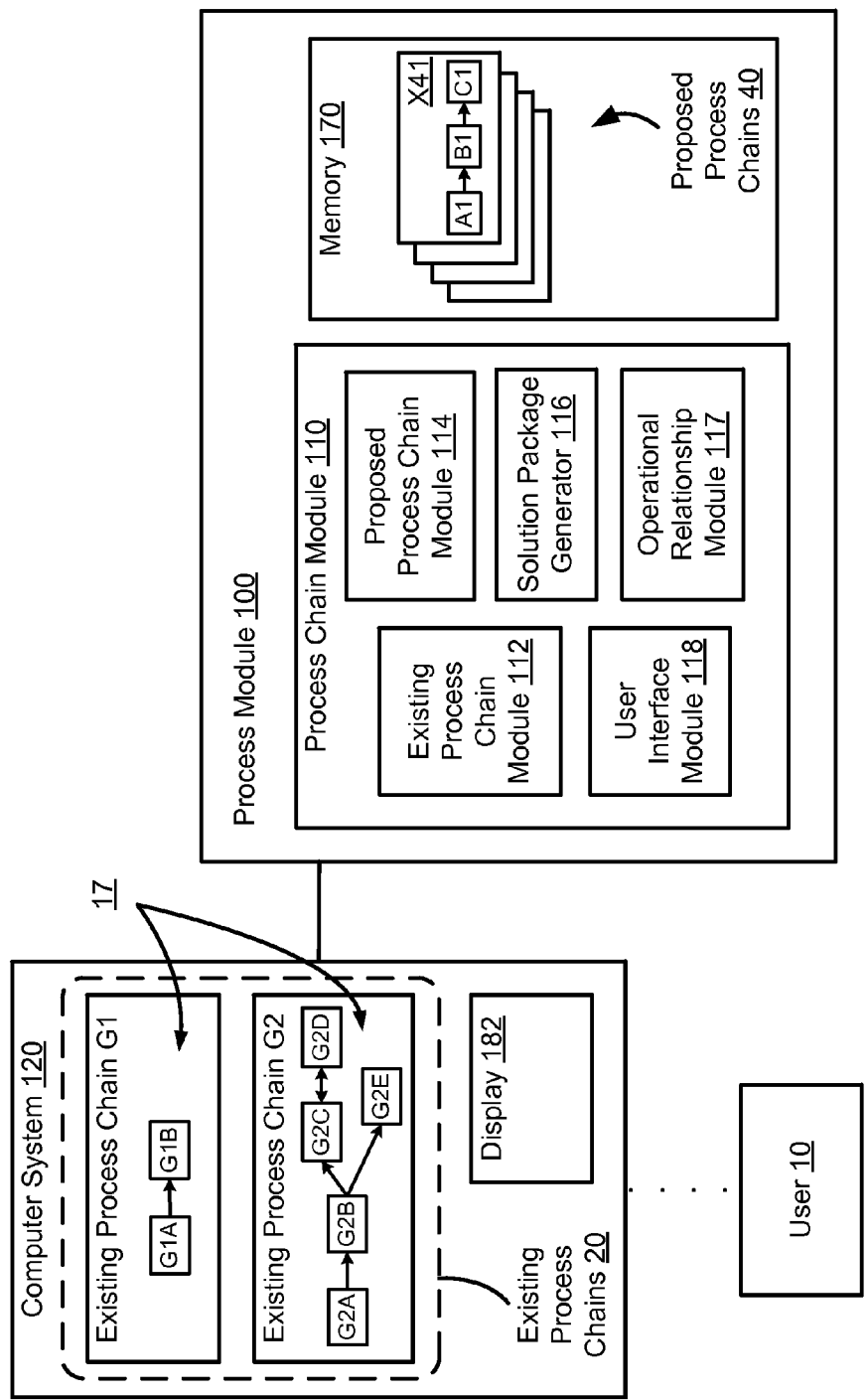
FIG. 1A is a block diagram that illustrates a process chain module of a process module.

FIG. 1A is a block diagram that illustrates a process chain module 110 of a process module 100. In this embodiment, the process chain module 110 is configured to produce a solution package associated with one or more of the existing process chains G1 and G2 of a computer system 120 (also can be referred to as a target system). The existing process chains G1 and G2 can collectively be referred to as existing process chains 20. Specifically, the process chain module 110 is configured to produce a solution package that adds (e.g., appends) the functionality associated with one or more of the proposed process chains 40 to one or more of the existing process chains 20 implemented (e.g., installed) at the computer system 120. In some embodiments, functionality from one or more of the proposed process chains 40 can be added to (e.g., appended to) one or more of the existing process chains 20 so that the functionality of one or more existing process chains 20 can be enhanced (e.g., expanded). In some embodiments, the existing process chains 20 and/or the proposed process chains 40 can be software and/or hardware implementations of a business process (e.g., an engineer-to-order process).

The proposed process chains 40 can be defined by a hierarchy that includes segments, enterprise processes, and/or process steps. The proposed process chains 40 can include segments that collectively define the process chain of the proposed process chains 40. For example, as shown in FIG. 1, proposed process chain X41 from the proposed process chains 40 includes segments A1 through C1 (also can be referred to as proposed segments). In some embodiments, each of the segments of the proposed process chains 40 can include one or more enterprise processes (not shown), and each of the enterprise processes can include one or more process steps (not shown).

Similarly, the existing process chains 20 can be defined by a hierarchy that includes segments, enterprise processes, and process steps. For example, each of the existing process chains G1 and G2 can include segments (also can be referred to as existing segments). Specifically, existing process chain G1 include segments G1A and G1B, and existing process chain G2 includes segments G2A through G2E. Also, each of the segments of the existing process chains 20 can include one or more enterprise processes (not shown), and each of the enterprise processes can include one or more process steps (not shown). An abstract example of a process chain hierarchy (e.g., an existing process chain hierarchy, a proposed process chain hierarchy) is shown in FIG. 2.

Figure 2:
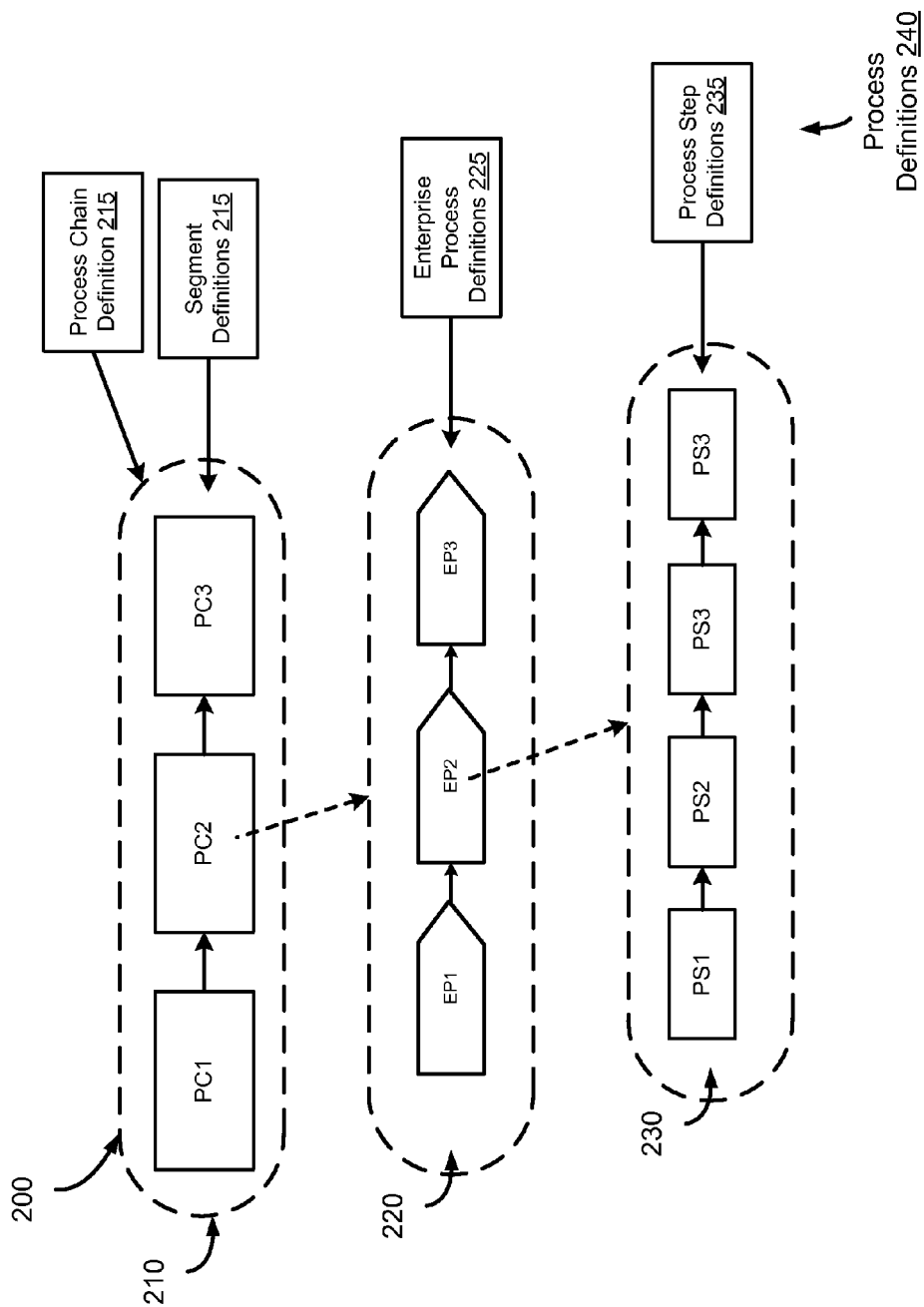
FIG. 2 is a block diagram that illustrates a process chain hierarchy.

FIG. 2 is a block diagram that illustrates a process chain hierarchy. As shown in FIG. 2, the process chain 200 includes segments PC1 through PC3 (segments 210). In some embodiments, the segments of the process chain PC can each be referred to as process chain segments or as partial chains. The process chain 200 can define a process chain level of the hierarchy of the process chain 200, and the segments 210 can be associated with a segment level of the hierarchy of the process chain 200. The segment PC2 is defined by enterprise processes EP1 through EP 3 (enterprise processes 220). The enterprise processes 220 can be associated with an enterprise process level of the hierarchy of the process chain 200. The enterprise process EP2 is defined by process steps PS1 through PS4 (process steps 230). The process steps 230 can be associated with a process step level of the hierarchy of the process chain 200.

As a specific example, the proposed process chain 200 can be an engineer-to-order process chain, and one or more of the segments 210 of the engineer-to-order process chain can be, for example, an engineer-to-order sales quote segment (PC1), a special production segment, a standard invoice segment, and/or so forth. One or more of the enterprise processes 220 can be, for example, a quotation enterprise process, a project execution enterprise process, a production enterprise process, and/or so forth. Each of the enterprise processes 230 can include one or more process steps 230 such as a credit check process step, an advertising campaign determination step, and/or so forth. More details related to the hierarchical relationships of process chains, segments, enterprise processes, and process steps are discussed, for example, in connection with FIGS. 6A through 7.

Referring back to FIG. 1A, operational relationships between the segments (e.g., segments of the existing process chains 20, segments of the proposed process chains 40) are represented by arrows between the segments. Specifically, the double-sided arrows represent bidirectional operational relationships (e.g., bidirectional data transfer, bidirectional triggering of functions, bidirectional access) and the single-sided arrows represent operational relationships in a single direction (e.g., a unidirectional operational relationship). For example, the segment A1 included in proposed process chain X41 can be configured to operate with (e.g., trigger functionality of, send data to) segment B1 included in proposed process chain X41. As another example, the segment G1A included in existing process chain G1 can be configured to operate with segment G1B included in existing process chain G1 as represented by the arrow between segment G1A and segment G1B.

The process module 100 can be configured to produce a solution package that includes an implementation of one or more segments (or portion(s) of thereof) of one or more of the proposed process chains 40 so that the segment(s) of the proposed process chain(s) 40 can operate with (e.g., can be accessed by, can be triggered by) existing process chain G1 and/or operate with existing process chain G2. In other words, segments (or portion(s) thereof) of the proposed process chain(s) 40 that can operate with the existing process chain(s) 20 can be included in a solution package. In some embodiments, the segment(s) of the proposed process chain(s) 40 (or portion(s) thereof) can be triggered by, for example, a process step (e.g., instances of a triggering process step) included in an enterprise process of a segment of the existing process chain(s) 20.

In some embodiments, the segment(s) (or portion(s) thereof) of the proposed process chain(s) 40 can be consolidated in one or more solution packages, so that separate instances of the segment(s) (or portion(s) thereof) of the proposed process chain(s) 40 do not need to be included in each of existing process chains 20. For example, in some embodiments, existing process chains G1 and G2 can operate with a common segment of one of the proposed process chains 40 included into a solution package.

As a specific example, segment C1 from the proposed process chain X41 can be included in a solution package that can operate with existing process chain G1 and existing process chain G2. The functionality of the segment C1 from the proposed process chain X41, when included in the solution package, can be triggered by, for example, segment G1B of the existing process chain G1. The segment C1, when included in the solution package, can be configured to trigger, for example, the functionality of segment G2A of the existing process chain G2.

In some embodiments, one or more new process chains can be defined based on a combination of segments of the proposed process chains 40 with the existing process chains 20. For example, segments A1 and segment C1 from the proposed process chain X41 can be included in a solution package that can operate with existing process chain G1 to define two new process chains. The first new process chain can include segment A1 from proposed process chain X41 and segments G1A and G1B from the existing process chain G1. The second new process chain can include segment C1 from proposed process chain X41 and segments G1A and G1B from the existing process chain G1. In this example, the segments G1A and G1B from the existing process chain G1 are reused in each of the new process chains.

In some embodiments, one or more of the proposed process chains 40 can each be an end-to-end process chain. Accordingly, the functionality from one or more of the proposed process chains 40 can be added to one or more of the existing process chains 20 so that the one or more existing process chains 20, when combined with the functionality of the one or more proposed process chains 40 in a solution package, can define an end-to-end process chain. For example, the proposed process chain X41 can be an end-to-end process chain that is defined by segments A1 through C1. The existing process chain G1 may not be an end-to-end process chain, but the segments G1A and G1B may correspond with (e.g., may have functionality that corresponds with) segments A1 and B1 of the proposed process chain X41. The functionality of segment C1 from the proposed process chain X41 can be added to the existing process chain G1 in a solution package, so that segments G1A and G1B combined with segment C1 (when in a solution package) can collectively define an end-to-end process chain that corresponds with the proposed process chain X41. Thus, the existing process chain G1 can be adapted to have the overall functionality of the proposed process chain X41 via an operational relationship with the solution package including the segment C1 of the proposed process chain X41.

Although not shown in FIG. 1A, the existing process chains 20 and/or the proposed process chains 40 can be associated with one or more process definitions. A process definition can include information associated with one or more functions of any portion of one or more of the existing process chains 20 and/or one or more of the proposed process chains 40. For example, a process definition associated with existing process chain G2 can include information about the functionality of the existing process chain G2, interfaces between one or more portions of the existing process chain G2, the version of one or more portions of the existing process chain G2, the operational relationships within the existing process chain G2, data that can be processed within the existing process chain G2 (and/or a portion thereof), and/or so forth.

Process definitions, like the process chains themselves, can have a hierarchy including process chain definitions, segment definitions, enterprise process definitions, and process step definitions. In other words, a process definition can include information associated with any level of hierarchy of the existing process chain(s) 20 and/or the proposed process chain(s) 40. In some embodiments, each of these process definitions, when associated with a specified level of hierarchy of a process chain, can be referred to as a type of process definition. In some embodiments, a process chain definition (which is associated with a process chain level of the hierarchy of a process chain) can include information about the overall functionality of a process chain. A segment definition (which is associated with a segment level of the hierarchy of a process chain) can include information about one or more segments of the process chain. An enterprise process definition (which is associated with an enterprise process level of the hierarchy of a process chain) can include details about one or more enterprise processes included in a segment, and a process step definition (which is associated with a process step level of the hierarchy of a process chain) can include details about one or more process steps included in an enterprise process.

In some embodiments, the level of detail of a process definition can be correlated to the hierarchy. For example, a process chain definition (which is associated with a process chain level of the hierarchy of a process chain) can include high-level information while a process step definition (which is associated with a process step level of the hierarchy of a process chain) can include relatively granular information (compared with the process chain definition) about a particular process step. Thus, the process steps definitions lower in a hierarchy of a process chain can include details that are not included in higher levels of a hierarchy of the process chain. In some embodiments, process definitions higher in a hierarchy of a process chain can be a superset of process definitions lower in the hierarchy of the process chain. For example, a process chain definition can include the information included in a segment definition, while the segment definition may not include information that is included in the process chain definition.

FIG. 2 illustrates process definitions 240 associated with each of the levels of hierarchy of the process chain 200. Specifically, a process chain definition 205 is associated with the process chain 200 (at the process chain level), segment definitions 215 are associated with the segments 210 (at the segment level), enterprise process definitions 225 are associated with the enterprise processes 220 (at the enterprise process level), and process step definitions 235 are associated with the process steps 230 (at the process step level).

In some embodiments, the process definitions 240 can be referenced within one another. For example, a segment definition from the segment definitions 215 related to segment PC2 can include references to enterprise process definitions from the enterprise process definitions 225 related to enterprise processes included in segment PC2. Thus, a process module (such as process module 100 shown in FIG. 1A) can access information included in a process definition related to a particular level of a hierarchy of a process chain on an as-needed basis by navigating references included within the process definitions.

Referring back to FIG. 1A, as discussed herein, a solution package associated with an existing process chain can be any type of hardware and/or software combination that can operate with the existing process chains 20 (which can also be based on any type of hardware and/or software combination) at the computer system 120. In other words, the solution package can be an implementation of (or can be used to implement) one or more of the segments (or a portion thereof) of the proposed process chains 40 in a solution package associated with the existing process chains 20 at the computer system 120. For example, the solution package can be an executable software module that can be installed on the computer system 120.

One or more existing process chains 20 and/or one or more proposed process chains 40 can be processed by the process module 100 (e.g., the process chain module 110 of the process module 100) to produce one or more solution packages. Specifically, the processing performed by the process module 100 can be, in some embodiments, categorized into one or more stages of processing. An example of stages of processing that can be performed by the process module 100 to produce one or more solution packages is shown in FIG. 1B.

Figure 1B:
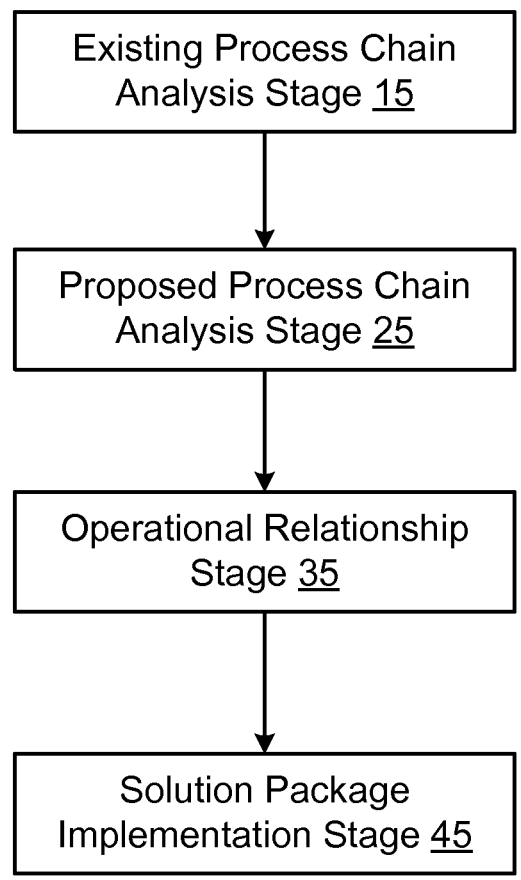
FIG. 1B is a flowchart that illustrates stages during which processing can be performed by the process module shown in FIG. 1A to produce one or more solution packages.

FIG. 1B is a flowchart that illustrates stages during which processing can be performed by the process module 100 shown in FIG. 1A to produce one or more solution packages. As shown in FIG. 1B, the flowchart includes an existing process chain analysis stage 15, a proposed process chain analysis stage 25, an operational relationships stage 35, and a solution package implementation stage 45. In some embodiments, the first three stages of the flowchart can be used to model potential modifications (e.g., appending segments) to the existing process chains 20. Accordingly, the first three stages of the flowchart can be referred to as modeling stages. During the solution package implementation stage 45 a solution package can be produced. In some embodiments, the first three stages of the flowchart can be used to model potential modifications to the existing process chains 20 without producing a solution package during the solution package implementation stage 45. The operation of the process module 100, and in particular, the operation of the process chain module 110 will be discussed below in connection with the stages shown in FIG. 1B.

As shown in FIG. 1A, the process chain module 110 includes an existing process chain module 112. During the existing process chain analysis stage 15 (shown in FIG. 1B), the existing process chain module 112 is configured to select one or more of the existing process chains 20 that are eligible for operation with a solution package. An existing process chain can be referred to as being eligible for operation with a solution package when at least a portion of the existing process chain can be configured to operate with (e.g., trigger at least a portion of) the solution package.

The existing process chain module 112 can be configured to determine whether or not one or more portions (e.g., process steps) of the existing process chains 20 can be configured to trigger at least a portion of a proposed process chain included in a solution package based on one or more eligibility conditions (not shown). An eligibility condition is any type of condition that can be used to determine the eligibility of one or more of the existing process chains 20 for operation with a solution package. An eligibility condition can be used to enforce one or more prerequisites (e.g., an upgrade prerequisite, a configuration prerequisite) that can be, for example, defined by a user (e.g., an administrator). Thus, an eligibility condition can be defined based on one or more prerequisites. In some embodiments, an existing process chain that is eligible for operation with a solution package can be referred to as being eligible, or eligible for operation. In some embodiments, an existing process chain that is not eligible for operation with a solution package can be referred to as being ineligible, or ineligible for operation.

For example, an eligibility condition may be satisfied for a particular existing process chain from the existing process chains 20 when the existing process chain can be configured to interface with (e.g., send data to, received data from) a solution package. As a specific example, existing process chain G1 may be eligible for operation because existing process chain G1 can be interfaced with (e.g., can trigger functionality of) a solution package, while existing process chain G2 may not be eligible because existing process chain G2 cannot be interfaced with (e.g., cannot trigger functionality of) a solution package. In some embodiments, an eligibility condition may be satisfied for a particular existing process chain from the existing process chains 20 when the existing process chain can be configured to trigger functionality associated with one or more segments of the proposed process chains 40 that can be included in one or more solution package. In some embodiments, an eligibility condition may be satisfied for a particular existing process chain from the existing process chains 20 when the existing process chain is associated with a program version (e.g., program version 1.2C) that is compatible with a program version of one or more segments of the proposed process chains 40 that can be included in one or more solution packages. In some embodiments, one or more eligibility conditions (not shown) can be stored in (e.g., stored in an eligibility condition database) and/or accessed from a memory 170.

In some embodiments, the existing process chain module 112 can be configured to determine the eligibility of one or more of the existing process chains 20 for operation with one or more solution packages based on a process definition (e.g., a process chain definition, a segment definition, an enterprise process definition, a process step definition) associated with one or more portions of the existing process chains 20 satisfying one or more eligibility conditions. For example, the existing process chain module 112 can be configured to determine that at least a portion of existing process chain G2 is eligible for operation with a solution package based on a portion of a segment definition of existing process chain G2 that satisfies an eligibility condition. These example eligibility conditions are presented by way of example only, and are not inclusive of all of the types of eligibility conditions that can be used to determine the eligibility of one or more of the existing process chains 20.

The process chain module 110 also includes a proposed process chain module 114. During the proposed process chain selection stage 25 (shown in FIG. 1B), the proposed process chain module 114 is configured to select one or more proposed process chains 40 stored in the memory 170 that have portions (e.g., segments, process steps) that can be appended to at least a portion of one or more of the existing process chains 20. For example, each of the proposed process chains 40 can include one or more segments that can be appended (via an operational relationship) to one or more of the existing process chains 20 via a solution package.

The proposed process chain module 114 can be configured to determine whether or not one or more of the proposed process chains 40 includes portions that can be appended to one or more of the existing process chains 20 based on one or more solution package conditions (not shown). A solution package condition is any type of condition that can be used to select at least one of the proposed process chains 40 for adaptation to at least one of the existing process chains 20. A solution package condition can be used to enforce one or more prerequisites (e.g., an upgrade prerequisite, a configuration prerequisite) for an operational relationship between a solution package and at least one of the existing process chains 20. Thus, a solution package condition can be produced based on one or more prerequisites (which can be defined by a user such as an administrator).

In some embodiments, The proposed process chain module 114 can be configured to determine whether or not one or more of the proposed process chains 40 includes one or more portions that can be appended to at least one of the existing process chains 20 based on at least a portion of a process definition (or a portion thereof) associated with the existing process chains 20 satisfying one or more solution package conditions. For example, the proposed process chain module 114 can be configured to select a proposed process chain from proposed process chains 40 for operation with existing process chain G2 based on a portion of a segment definition of existing process chain G2 that satisfies a solution package condition.

For example, a solution package condition may be satisfied for a particular proposed process chain from the proposed process chains 40 when the proposed process chain has at least one segment that corresponds with at least one of segments of at least one of the existing process chains 20 (or a subset that is eligible). A determination as to whether or not at least one segment from the proposed process chain corresponds with at least one of the segments of at least one of the existing process chains 20 can be determined based on a comparison of their respective process definitions (or portions thereof). A segment from the proposed process chain can correspond with a segment of at least one of the existing process chains 20 when the segment from the proposed process chain is identical to, or has equivalent functionality to, the segment of at least one of the existing process chain 20. As a specific example, proposed process chain X41 can be selected by the proposed process chain module 114 for potential operation with existing process chain G2 when the proposed process chain X41 includes a segment (e.g., segment B1) that corresponds with a segment (e.g., segment G2B) of the existing process chain G2 (and is eligible).

As another example, a solution package condition may be satisfied for a particular proposed process chain from the proposed process chains 40 when the proposed process chain can interface (e.g., compatibly interface) with at least one of segments of at least one of the existing process chains 20 (or subset that is eligible). As a specific example, proposed process chain X41 can be selected by the proposed process chain module 114 for potential operation with existing process chain G1 when the proposed process chain X41 includes a segment (e.g., segment C1) that can interface with a segment (e.g., segment G1A) of the existing process chain G1 (and when existing process chain G1 is eligible). In some embodiments, proposed process chain X41 may not be selected by the proposed process chain module 114 for potential operation with existing process chain G1 when the existing process chain G1 is ineligible (even though the proposed process chain X41 includes a segment that can interface with a segment of the existing process chain G1). In some embodiments, the compatibility of one or more of the proposed process chains 40 with the existing process chains 20 can be determined based on their respective process definitions (or portions thereof).

In some embodiments, the proposed process chain module 114 can be configured to select a proposed process chain from the proposed process chains 40 only if a portion of the proposed process chain can have an operational relationship with more than one of the existing process chains 20. For example, the proposed process chain module 114 can be configured to select a first proposed process chain from the proposed process chains 40 because the first propose process chain includes at least a portion that can have an operational relationship with both existing process chain G2 and existing process chain G2. A second proposed process chain may not be selected from the proposed process chains 40 because the second proposed process chain may have a portion that can have an operational relationship with only one existing process chain from the existing process chains 20.

In some embodiments, one or more solution package conditions may satisfied if one or more of existing process chains 20 and/or the proposed process chains 40 are modified. For example, a proposed process chain from the proposed process chains 40 may be associated with a first program version (e.g., program version 3.0) and the existing process chains 20 may be associated with a second program version (e.g., program version 1.0). The proposed process chain from the proposed process chains 40 may be selected by the propose solution package manager 114 if the existing process chains 20 are modified (e.g., upgraded) to a program version that is compatible with the first program version. These example solution package conditions are presented by way of example only, and are not inclusive of all of the types of solution package conditions that can be used to select one or more of the proposed process chains 40 for operation with the existing process chains 20.

In some embodiments, at least some portions of processing associated with the existing process chain analysis stage 15 and at least some portions of the proposed process chain analysis stage 25 can be performed concurrently. For example, eligibility of one or more of the existing process chains 20 can be determined based on one or more eligibility conditions in parallel with a determination as to whether or not one or more of the proposed process chains 40 includes a portion that can be appended to one or more of the proposed process chains 40 based on one or more solution package conditions.

As shown in FIG. 1A, the process chain module 110 includes an operational relationship module 117. During the operational relationship stage 35 (shown in FIG. 1B), the operational relationship module 117 is configured to determine one or more prerequisites and/or one or more options for one or more operational relationships between the existing process chains 20 and the proposed process chains 40 selected during the existing process chain analysis stage 15 and the proposed process chain analysis stage 25, respectively. In some embodiments, options for an operational relationship can be referred to as operational relationship options, or as options, and prerequisites for an operational relationship can be referred to as operational relationship prerequisites, or as prerequisites.

In some embodiments, a prerequisite can be a requirement for the functionality of an operational relationship between at least a portion of one or more of the existing process chains 20 and a solution package (including at least a portion of one or more of the proposed process chains 40). For example, the operational relationship module 117 can be configured to determine a prerequisite for implementation of an operational relationship between a segment of the existing process chain G1 and a segment of the proposed process chain X41, which can be included in a solution package. The prerequisite can include, for example, a requirement to modify (e.g., upgrade) at least a portion of the segment of the existing process chain G1 so that the segment of the proposed process chain X41 can have an operational relationship (e.g., can have a functional operational relationship) with the segment of the existing process chain G1.

In some embodiments, the options can be selectable features related to (also can be referred to as proposed operation features) operational relationships that can be used to produce a solution package (including at least a portion of one or more of the proposed process chains 40) for one or more of the existing process chains 20. In other words, the proposed process chains 40 can be associated with, or can include, a definition (e.g., a map, a set of parameter values, a database) of operational relationship options (e.g., interface options)

that can be included in a solution package. For example, the operational relationship module 117 can be configured to determine an option that can be implemented for an operational relationship between the segment of the existing process chain G1 and the segment the proposed process chain X41, when included in the solution package. The option can include, for example, an option related to a type of interface for the operational relationship between the segment of the existing process chain G1 and the segment of the proposed process chain X41. In some embodiments, an option can include, for example, an option related to an interface (e.g., an external interface) with a an external application (e.g., third-party application) different from an application or platform associated with the existing process chains 20 and/or the proposed process chains 40.

As shown in FIG. 1A, the process chain module 110 includes a user interface module 118 configured to define one or more user interfaces (not shown in FIG. 1A) that can be presented to a user 10. The user interfaces can be presented to the user 10 via a display 182 of the computer system 120. The user interface module 118 can be configured to manage (e.g., send, manipulate, trigger execution of) user interfaces through which users such as user 10 can access (e.g., use, trigger) the functionality of the process module 100 (e.g., the functionality of the process chain module 110). For example, prerequisites and/or options related to operational relationships between one or more of the proposed process chains 40 and one or more of the existing process chains 20 can be presented to the user 10 via a user interface of the user interface module 118. Specifically, one or more of the operational relationship prerequisites can be visually represented for to a user (e.g., user 10) via a user interface of the user interface module 118. Also, one or more of the operational relationship options can be visually represented for selection by a user (e.g., user 10) via the user interface of the user interface module 118, and the selected operational relationship options can be included in the solution package for one or more of the existing process chains 20. Accordingly, the proposed process chains 40 can each function as a tool that can be used (e.g., used by a user) to produce a solution package for one or more the existing process chains 20. Said differently, the proposed process chains 40 can be used to produce solution packages that can be actually installed on the computer system 120.

In some embodiments, prerequisites that may satisfy one or more solution package conditions and/or eligibility conditions can be presented to the user 10. These prerequisites may be presented to the user 10 so that the user 10 can optionally make modifications to satisfy one or more of the solution package conditions and/or one or more of eligibility conditions. For example, the process chain module 110 (e.g., via a user interface module 118 of the process chain module 110) can be configured to notify the user 10 that at least a portion of a proposed process chain from the proposed process chains 40 may have an operational relationship with one or more of the existing process chains 20 if the one or more existing process chains 20 is modified (e.g., upgraded to a specified program version). Accordingly, one or more of the existing process chains 20 can be modified (e.g., upgraded to at least the specified program version) to be compatible with a solution package produced based on a proposed process chain from the proposed process chains 40. In some embodiments, one or more solution package conditions and/or eligibility conditions may be over-ridden (e.g., manually disabled, ignored) by the user 10.

In some embodiments, one or more of the user interfaces of the user interface module 118 can be, for example, a browser-based user interface that includes various buttons, links, controls, services, and/or so forth that can be used by a user (such as a user 10) to access the functionality of the process module 100. The user interface(s) can be rendered within the display 182 for the user 10 so that the user 10 can access one or more functions of the process module 100. For example, the user 10 can, using the computer system 120, access a user interface served by the user interface module 118 to a browser application of the computer system 120. The user 10 can then use the user interface to trigger one or more functions associated with the computer system 120.

As shown in FIG. 1A, the functionality of the process module 100 can be accessed (e.g., can be triggered) via the computer system 120 on which the existing process chains 20 are installed. Specifically, the functionality of the process module 100 can be accessed via the computer system 120 and the display 182 of the computer system 120. In some embodiments, the functionality of the process module 100 can be accessed (e.g., can be triggered) by the user via a terminal device (not shown) associated with the computer system 120.

In some embodiments, a portion of at least one of the proposed process chains 40 can have one or more proposed mandatory operational relationships (which can be proposed operation features) with at least a portion of one or more existing process chains 40. For example, an operational relationship between a proposed process chain included in proposed process chain X41 and existing process chain G1 can be classified as a mandatory operational relationship based on a process definition associated with the existing process chain G1. Accordingly, if a solution package is produced based on the proposed process chain X41, the solution package must include an implementation of the operational relationship between the proposed process chain X41 (included in the solution package) and the existing process chain X41. In other words, the existing process chain G1 must be configured to operate with the proposed process chain X41 (included in the solution package) based on the mandatory operational relationship.

In some embodiments, an operational relationship between at least a portion of at least one proposed process chain 40 and at least a portion of at least one existing process chain 20 can be classified as an optional operational relationship. For example, if a solution package is produced based on proposed process chain X41 and the existing process chain G1, the solution package could include an implementation of the operational relationship between the proposed process chain 40 (included in the solution package) and the existing process chain G1. In other words, the existing process chain G1 can be configured to operate with the proposed process chain X41 (included in the solution package) based on the optional operational relationship.

As shown in FIG. 1A, the process chain module 110 includes a solution package generator 116 configured to produce a solution package based on one or more of the proposed process chains 40. During the solution package implementation stage 45 (shown in FIG. 1B), the solution package generator 116 can be configured to produce the solution package based on one or more of the options (e.g., selected options) and/or prerequisites related to an operational relationship between at least one of the existing process chains 20 and at least one of the proposed process chains 40.

In some embodiments, the solution package can include configuration data associated with a configuration file defining at least a portion of the existing process chain 20 and/or proposed process chain 40 (or portion thereof) for which the solution package is produced. Configuration data can be included in a database repository and can be configured to define one or more functions of one or more proposed process chains associated with one or more existing process chains.

In some embodiments, a solution package can be, or can include, one or more databases, any type of executable software module such as a computer program based on, but not limited to, micro-code or micro-instructions, machine instructions, such as produced by a compiler, code used to produce a web service, and files containing higher-level instructions that are executed by a computer using an interpreter. For example, or more portions of a solution package may be implemented using Java, C++, or other programming languages (e.g., object-oriented programming languages) and development tools. In some embodiments, a solution package for one or more existing process chains can define at least a portion of one or more applications or can be associated with one or more applications of the computer system 120. In some embodiments, a solution package can be, or can include, a user interface component associated with one or more existing process chains, and the user interface component can be configured for display (e.g., rendering). In some embodiments, one or more solution packages can have, or can be, a background process with functionality that is not visible (i.e., not displayed).

Although not shown, in some embodiments, the process module 100 (or portions thereof) can be configured to operate within, for example, a data center (e.g., a cloud computing environment), a computer system, one or more server/host devices, and/or so forth. In some embodiments, the functionality of the process module 100 can be distributed to several devices.

In some embodiments, one or more portions of the components shown in the process module 100 in FIG. 1A can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the process chain module 110 can be, or can include, a software module configured for execution by at least one processor (not shown). The processor can be configured to execute one or more instructions and can include one or more co-processors and/or memory portions. In some embodiments, the functionality of the components can be included in different modules and/or components than those shown in FIG. 1A. For example, although not shown, the functionality of the process chain module 110 can be included in a different module than the process chain module 110, or divided into several different modules.

Although not shown, in some embodiments, the memory 170 can be implemented as more than one memory component (e.g., more than one random-access memory (RAM) component or disk drive memory) within the process module 100. In some embodiments, the memory 170 can be a database memory. In some embodiments, the memory 170 can be, or can include, a non-local memory (e.g., a memory not physically included within the process module 100). For example, the memory 170 can be, or can include, a memory shared by multiple devices (not shown). In some embodiments, the memory 170 can be associated with a server device (not shown) within a network and configured to serve the process module 100.

In some embodiments, the process module 100 (or portions thereof) and/or the computer system 120 (or portions thereof) can be configured to operate within a network. In other words, the process module 100 (or portions thereof) and/or the computer system 120 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The computer system 120 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), a host device, and/or so forth. The computer system 120 can be configured to operate based on one or more platforms (e.g., one or more similar or different platforms) that can include one or more types of hardware, software, firmware, operating systems, runtime libraries, and/or so forth. In some embodiments, computer system 120 can represent a cluster of devices (e.g., a server farm).

In some embodiments, the process module 100 (e.g., the solution package generator 116 of the process chain module 110) can be configured to produce a solution package based on any portion of the proposed process chains 40. For example, the process chain module 110 can be configured to produce a solution package related to individual functions (e.g., process steps or portions thereof) of a proposed process chain 40 for an operational relationship with an existing process chain 20. As a specific example, the process chain module 110 can be configured to produce a solution package that includes a process step (or portions thereof) of an enterprise process of a segment of the proposed process chain X41 that can be triggered by both existing process chain G1 and existing process chain G2 (e.g., triggered by instances of a triggering process step included in both existing process chain G1 and existing process chain G2). The eligibility of the existing process chains G1 and G2 can be determined based on one or more eligibility conditions and/or one or more process definitions associated with the process step of the proposed process chain X41 triggered by existing process chains G1 and G2. The proposed process chain X41 can be selected from the proposed process chains 40 based on one or more solution package conditions and/or one or process definitions associated with the process step of the proposed process chain X41.

Figure 3:
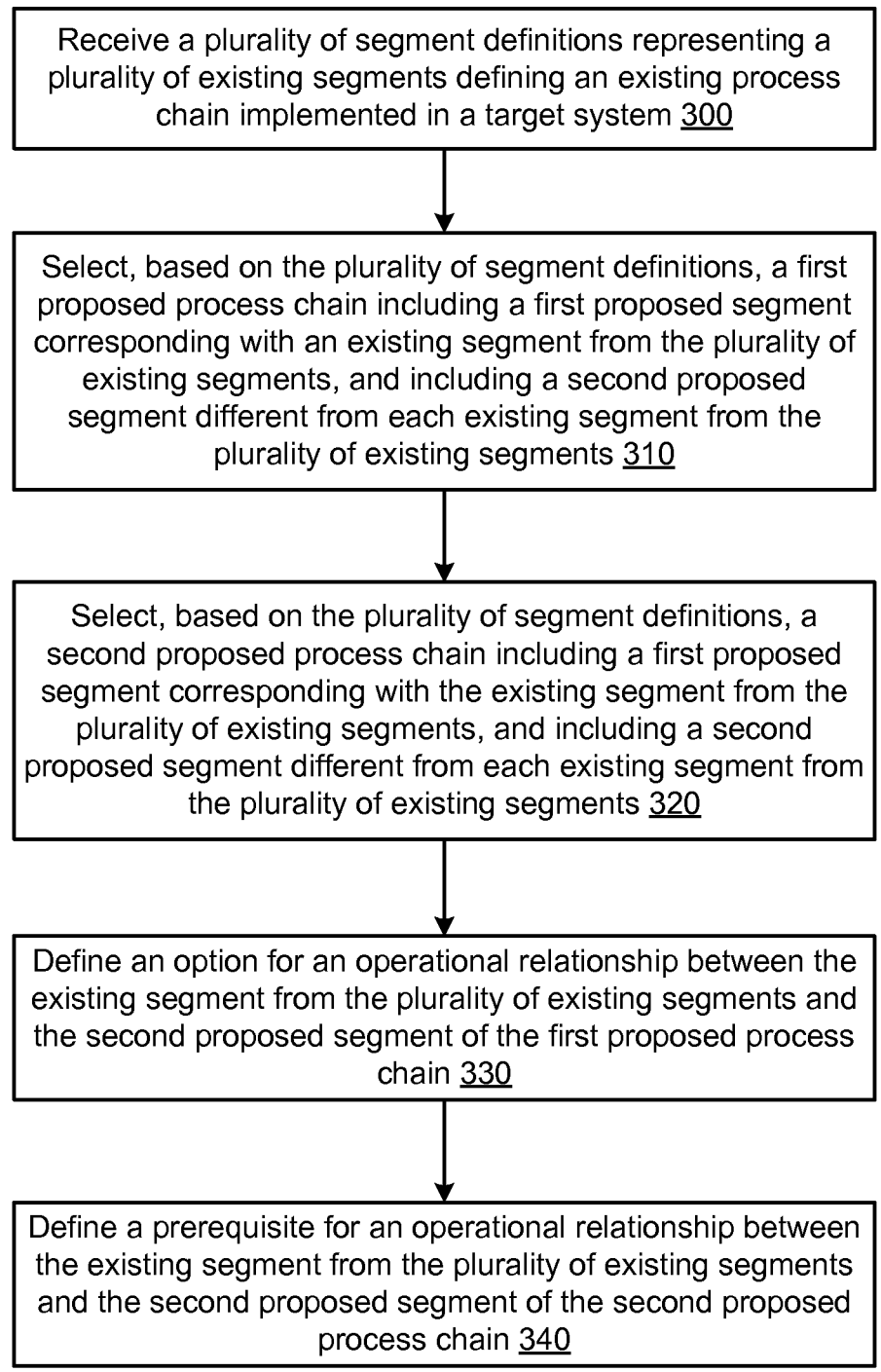
FIG. 3 is a flowchart that illustrates a method for defining a solution package.

FIG. 3 is a flowchart that illustrates a method for defining a solution package. At least some portions of the method shown in FIG. 3 can be performed by a process module (e.g., process module 100 shown in FIG. 1A).

As shown in FIG. 3, a plurality of segment definitions representing a plurality of existing segments defining an existing process chain implemented in a target system are received (block 300). For example, the existing process chain module 112 shown in FIG. 1 can be configured to receive the plurality of segment definitions representing a plurality of existing segments defining an existing process chain implemented in a target system. In some embodiments, the plurality of segment definitions can be stored in a database associated with the computer system where the plurality of existing process chains are implemented. In some embodiments, at least a portion of the plurality of segment definitions can be defined (by a process module) based on an analysis of the plurality of existing process chains implemented at the computer system. In some embodiments, at least a portion of the plurality of existing process chains can be selected based on an eligibility condition being satisfied. In some embodiments, the plurality of segment definitions can be received by an existing process chain module (e.g., existing process chain module 112 shown in FIG. 1A) during an existing process chain analysis stage (e.g., existing process chain analysis stage 15 shown in FIG. 1B).

Based on the plurality of segment definitions, a first proposed process chain is selected that includes a first proposed segment corresponding with an existing segment from the plurality of existing segments, and includes a second proposed segment different from each existing segment from the plurality of existing segments (block 310). For example, the proposed process chain module 114 shown in FIG. 1 can be configured to select, based on the plurality of segment definitions, a first proposed process chain that includes a first proposed segment corresponding with an existing segment from the plurality of existing segments, and includes a second proposed segment different from each existing segment from the plurality of existing segments.

The first proposed segment of the first proposed process chain can correspond with the existing segment from the plurality of existing segments when the functionality of the first proposed segment of the first proposed process chain is the same as (or substantially the same as) that of the existing segment. The first proposed segment of the first proposed process chain can be different than the existing segment from the plurality of existing segments because the functionality of the first proposed segment of the first proposed process chain is different than that of the existing segment. The first proposed process chain can be selected from a set of proposed process chains (such as proposed process chain is 40 shown in FIG. 1A). In some embodiments, the first proposed process chain can be selected based on a solution package condition being satisfied.

Based on the plurality of segment definitions, a second proposed process chain is selected that includes a first proposed segment corresponding with the existing segment from the plurality of existing segments, and includes a second proposed segment different from each existing segment from the plurality of existing segments (block 320). For example, the proposed process chain module 114 shown in FIG. 1 can be configured to select, based on the plurality of segment definitions, a second proposed process chain that includes a first proposed segment corresponding with the existing segment from the plurality of existing segments, and includes a second proposed segment different from each existing segment from the plurality of existing segments.

The first proposed segment of the second proposed process chain can correspond with the existing segment from the plurality of existing segments when the functionality of the second proposed segment of the second proposed process chain is the same as (or substantially the same as) that of the existing segment. The first proposed segment of the second proposed process chain can be different than the existing segment from the plurality of existing segments because the functionality of the first proposed segment of the second proposed process chain is different than that of the existing segment. The second proposed process chain can be selected from a set of proposed process chains (such as proposed process chain is 40 shown in FIG. 1A). In some embodiments, the second proposed process chain can be selected based on a solution package condition being satisfied.

In some embodiments, the first proposed process chain and the second proposed process chain can be selected by a proposed process chain module (e.g., proposed process chain module 114 shown in FIG. 1A). In some embodiments the first proposed process chain and the second proposed process chain can be selected during a proposed process chain analysis stage (e.g., proposed process chain analysis stage 25 shown in FIG. 1B).

An option for an operational relationship between the existing segment from the plurality of existing segments and the second proposed segment of the first proposed process chain is defined (block 330). For example, the operational relationship module 117 shown in FIG. 1 can be configured to define the option for an operational relationship between the existing segment from the plurality of existing segments and the second proposed segment of the first proposed process chain. In some embodiments, the option for the operational relationship can be selected for inclusion in a solution package by, for example, a user. In some embodiments, the option for the operational relationship may not be selected for inclusion in a solution package by, for example, a user.

Also, a prerequisite for an operational relationship between the existing segment from the plurality of existing segments and the second proposed segment of the second proposed process chain is defined (block 340). For example, the operational relationship module 117 shown in FIG. 1 can be configured to define the prerequisite for an operational relationship between the existing segment from the plurality of existing segments and the second proposed segment of the second proposed process chain. In some embodiments, the prerequisite can be related to an operation that must be performed before a solution package can be defined for the existing process chain. In some embodiments, the option for the operational relationship and the prerequisite for the operational relationship can be defined (or presented) by an operational relationship module (e.g., operational relationship module 117 shown in FIG. 1A) during an operational relationship stage (e.g., operational relationship stage 35 shown in FIG. 1B).

Figure 4A:
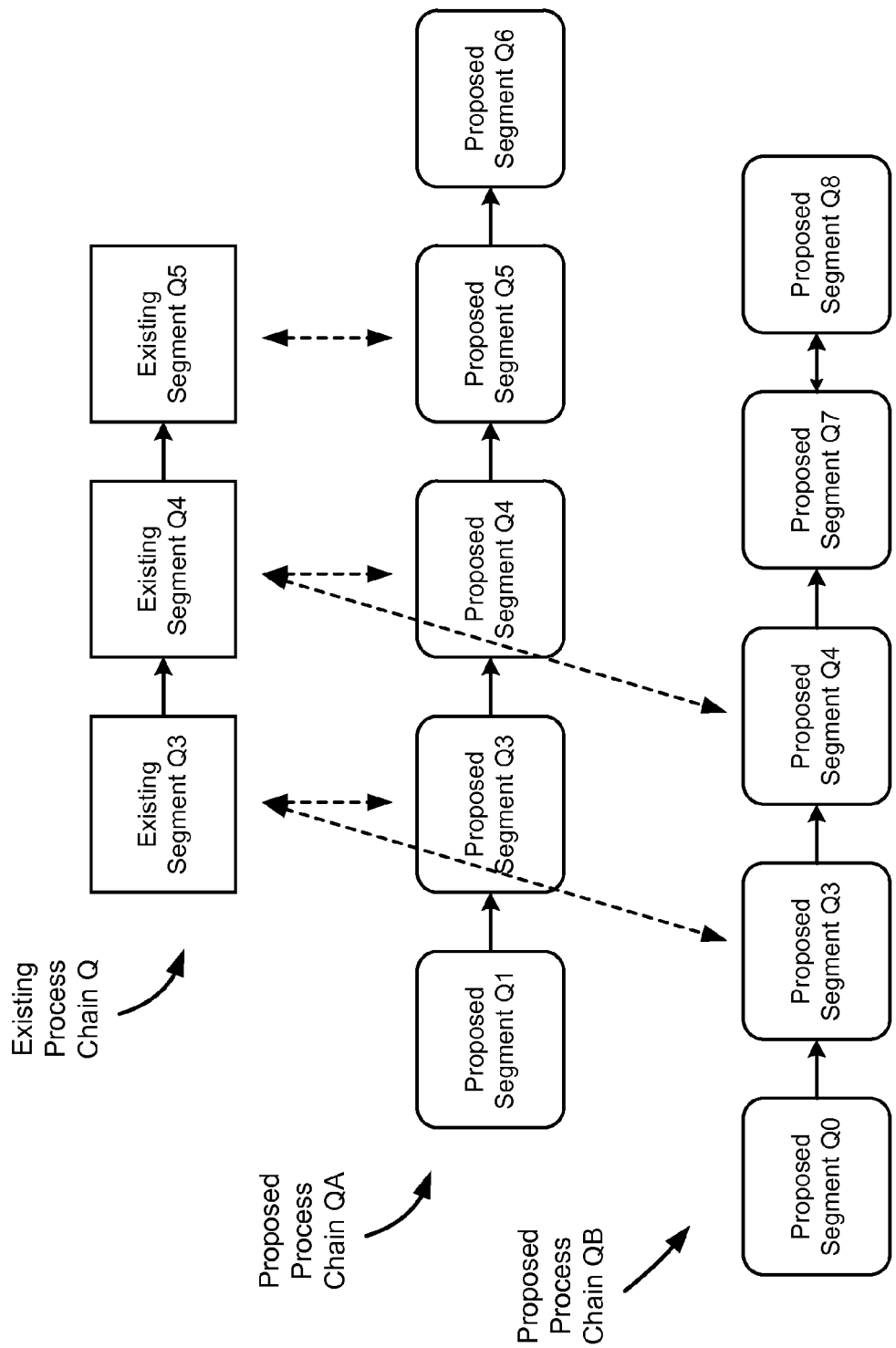
FIG. 4A is a block diagram that illustrates an existing process chain and several proposed process chains.

FIG. 4A is a block diagram that illustrates an existing process chain Q and several proposed process chains. Specifically, segments of the existing process chain Q are associated with segments of proposed process chain QA and proposed process chain QB. As shown in FIG. 4A, the existing process chain Q includes segments Q3 through Q5. The segments included in the existing process chain Q can be referred to as existing segments. Proposed process chain QA includes segments Q1 and Q3 through Q6, and proposed process chain QB includes segments Q0, Q3, Q4, Q7, and Q8. The segments included in the proposed process chains can be referred to as proposed segments. So that the existing segments of the existing process chain Q and the proposed segments of the proposed process chains can be more easily distinguished, the existing segments are illustrated in FIG. 4A as boxes with sharp corners, and the proposed segments of the proposed process chains are illustrated as boxes with rounded corners.

In this embodiment, operational relationships between the segments (e.g., proposed segments, existing segments) are represented by arrows between the segments. For example, the operational relationship between proposed segment Q7 and the proposed segment Q8 of the proposed process chain QB is a bidirectional operational relationship. In a bidirectional operational relationship one or more aspects (e.g., data transfer, triggering of functions, access) of the operational relationship can be bidirectional. As another example, the operational relationship between existing segment Q3 and existing segment Q4 of existing process chain Q is in a single direction (e.g., a unidirectional operational relationship).

In some embodiments, the existing process chain Q, the proposed process chain QA, and/or the proposed process chain QB can be any type of process chain (or portions thereof). For example, the proposed process chain QB can be an engineer-to-order process chain, a sell from stock process chain, a sell from stock consignment process chain, and/or so forth.

As illustrated by the dashed arrows shown in FIG. 4A, proposed segments Q3 through Q5 of the proposed process chain QA correspond with the existing segments Q3 through Q5, respectively, of the existing process chain Q. Also, proposed segments Q3 and Q4 of the proposed process chain QB correspond with the existing segments Q3 and Q4, respectively, of the existing process chain Q.

In some embodiments, the proposed process chain QA, the proposed process chain QB, and/or the existing process chain Q can be associated with the same or different program versions. For example, although proposed segments Q3 through Q5 of the proposed process chain QA correspond with the existing segments Q3 through Q5, respectively, of the existing process chain Q, the existing segments Q3 through Q5 of the proposed process chain QA can be an upgraded version of proposed segments Q3 through Q5 of the proposed process chain QA.

In some embodiments, a proposed process chain module (e.g., proposed process chain module 114 shown in FIG. 1A) can be configured to identify the correspondence between the existing segments of the existing process chain Q and the proposed segments of the respective proposed process chains QA and QB. In some embodiments, the proposed process chains QA and QB can be selected (based on the correspondence of the proposed segments of the proposed process chains QA and QB with the existing segments of the existing process chain Q) from a set of proposed process chains (e.g., proposed process chains 40 shown in FIG. 1A) as proposed process chains that have segments that can be added to the existing process chain Q. In some embodiments, the correspondence between the existing segments of the existing process chain Q and the proposed segments of the respective proposed process chains QA and QB can be performed during a proposed process chain analysis stage (e.g., proposed process chain analysis stage 25 shown in FIG. 1B). In some embodiments, the correspondence between the existing process chain Q and proposed process chains QA and QB can be presented to a user via a user interface so that a user can determine (e.g., select) whether one or more segments of the proposed process chains QA or QB should or should not be combined with the existing process chain Q using a solution package.

Figure 4B:
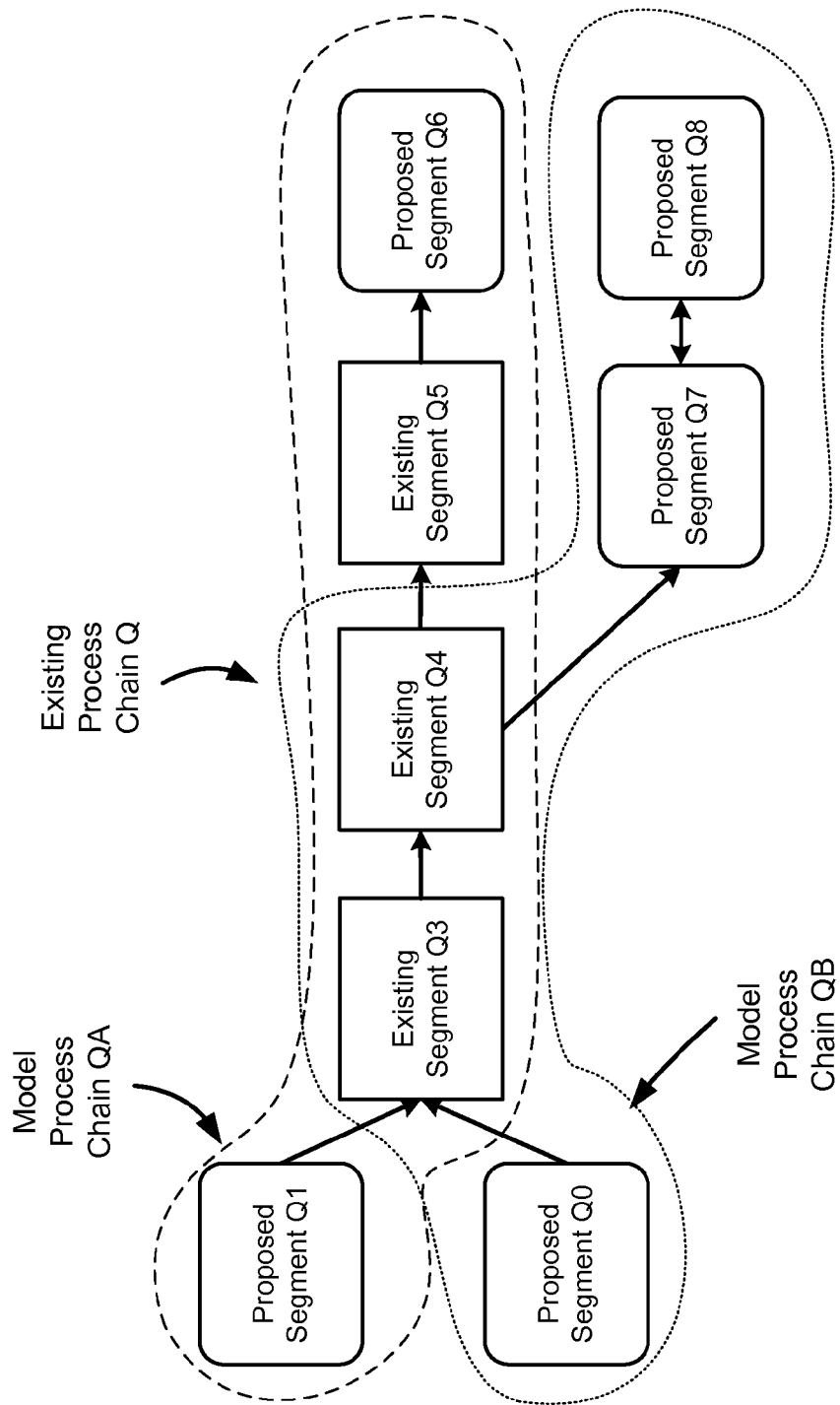
FIG. 4B is a block diagram that illustrates a combination of the existing process chain and the proposed process chains shown in FIG. 4A.

The FIG. 4B is a block diagram that illustrates a combination of the existing process chain Q and the proposed process chains shown in FIG. 4A. As shown in FIG. 4B, several of the proposed segments of the proposed process chains QA and QB are appended to the existing segments of the existing process chain Q to define model process chain QA and QB, respectively. Specifically, the proposed segments of the proposed process chains QA and QB that do not correspond with (or are not already included in) the existing segments of the existing process chain Q are appended to the existing process chain Q to define model process chain QA and QB, respectively.

As shown in FIG. 4B, proposed segments from the proposed process chain QA and existing segments from the existing process chain Q (which are shown in FIG. 4A) are combined to define model process chain QA. Specifically, proposed segment Q1 of proposed process chain QA is appended to (i.e., appended before) the existing segments of the existing process chain Q so that the proposed segment Q1 of proposed process chain QA has an operational relationship with existing segment Q3 of the existing process chain Q. In some embodiments, the operational relationship can be defined so that the proposed segment Q1 of proposed process chain QA is configured to trigger (e.g., trigger execution of) at least a portion of existing segment Q3 of the existing process chain Q. Proposed segment Q6 of proposed process chain QA is appended to (i.e., appended after) the existing segments of the existing process chain Q such that the proposed segment Q6 of proposed process chain QA has an operational relationship with existing segment Q5 of the existing process chain Q. In some embodiments, the operational relationship can be defined so that the existing segment Q5 of existing process chain Q is configured to trigger (e.g., trigger execution of) at least a portion of proposed segment Q6 of the proposed process chain QA.

As shown in FIG. 4B, the combination of the existing segments Q3 through Q5 of the existing process chain Q and the proposed segments Q1 and Q6 of the proposed process chain QA define model process chain QA that corresponds with the proposed process chain QA shown in FIG. 4A. Also, as shown in FIG. 4B, the existing segments Q3 through Q5 of the existing process chain Q are not replaced by the proposed segments Q3 through Q5 of the proposed process chain QA.

As shown in FIG. 4B, a proposed segments from the proposed process chain QB and existing segments from the existing process chain Q (which are shown in FIG. 4A) are combined to define model process chain QB. Specifically, proposed segment Q0 of proposed process chain QB is appended before the existing segments of the existing process chain Q so that the proposed segment Q0 of proposed process chain QB has an operational relationship with existing segment Q3 of the existing process chain Q. In some embodiments, the operational relationship can be defined so that the proposed segment Q0 of proposed process chain QB is configured to trigger (e.g., trigger execution of) at least a portion of existing segment Q3 of the existing process chain Q. Proposed segments Q7 and Q8 of proposed process chain QB are appended to the existing segments of the existing process chain Q. However, only proposed segment Q7 of proposed process chain QB has an operational relationship with existing segment Q4 of the existing process chain Q. The operational relationship can be defined so that the existing segment Q4 of existing process chain Q is configured to trigger (e.g., trigger execution of) at least a portion of proposed segment Q7 of the proposed process chain QB.

As shown in FIG. 4B, the combination of the existing segments Q3 and Q4 of the existing process chain Q and the proposed segments Q1, Q7, and Q8 of the proposed process chain QB define model process chain QB (which corresponds with the proposed process chain QB shown in FIG. 4A). In this embodiment, the existing segments Q3 and Q4 of the existing process chain Q are not replaced by the proposed segments Q3 and Q4 of the proposed process chain QB. Also, as shown in FIG. 4B, the existing segment Q5 of the existing process chain Q is not included in model process chain QB (which corresponds with the proposed process chain QB shown in FIG. 4A). Thus, not all of the existing segments from an existing process chain need to be included in a model process chain that is a combination of proposed segments of a proposed process chain and existing segments from an existing process chain.

As shown in FIG. 4B at least some of the existing segments of the existing process chain Q are common to (e.g., reused in) both model process chain QA and model process chain QB. Specifically, existing segment Q3 and existing segment Q4 are included in both model process chain QA and model process chain QB. Thus, two different process chains— model process chain QA and model process chain QB—can be produced by appending segments to the existing segments of the existing process chain Q. In some embodiments, model process chain QA can be considered a variant of model process chain QB, and vice versa.

In some embodiments, the model process chains QA and QB can be defined by a proposed process chain module (e.g., proposed process chain module 114 shown in FIG. 1A). In some embodiments, the model process chains QA and QB can be presented to a user via a user interface defined by a user interface module (e.g., user interface module 118 shown in FIG. 1A).

In the embodiment shown in FIG. 4B, the proposed segments of the proposed process chains QA and QB are combined with the existing segments of the existing process chain Q to define model process chains that corresponds with the proposed process chains QA and QB (shown in FIG. 4A). Although not shown in FIG. 4B, in some embodiments, less than all of the proposed segments of the proposed process chains QA and/or QB may be combined with all, or less than all, of the existing segments of the existing process chain Q to define model process chains. For example, model process chain QA can be defined without proposed segment Q8 from proposed process chain QA. As another example model process chain QA can be defined without existing segment Q4 of the existing process chain Q. In these examples, model process chain QA would not correspond with the proposed process chain QA.

In some embodiments, if presented to a user via a user interface, the user interface can be defined so that the user may modify model process chain QA and/or QB via the user interface after the model process chains QA and QB have been defined as shown in FIG. 4B. For example, one or more of the proposed segments and/or existing segments can be removed from the model process chains. In some embodiments, one or more operational relationships between one or more of the proposed segments and one or more of the existing segments can be modified. For example, one or more operational relationships can be modified so that an order of the proposed segments and the existing segments included in model process chain QB are different than that shown in FIG. 4B.

In some embodiments, one or more of the segments from the proposed process chains QA in QB shown in FIG. 4A can be selected to replace one or more of the existing segments from the existing process chain Q. For example, proposed segment Q3 from proposed process chain QB shown in FIG. 4A can be selected to replace existing segment Q3 included in existing process change Q. In some embodiments, if presented to a user via a user interface, the user interface can be used by the user to make this type of modification.

Although not shown in FIG. 4B, one or more options and/or one or more prerequisites can be related to the operational relationships between the existing segments and/or proposed segments of the model process chains QA and QB. For example, a prerequisite for the operational relationship between existing segment Q4 proposed segment Q7 can be an upgrade to existing segment Q4. In some embodiments, one or more interfaces associated with existing segment Q4 and/or proposed segment Q7 may need to be modified so that existing segment Q4 and proposed segment Q7 can have an operational relationship (e.g., a compatible operational relationship).

In some embodiments, one or more of the proposed segments from the proposed process chains QA and/or QB can be appended to the existing segments of the existing process chain Q to automate portions of a process (not shown) that are performed manually in conjunction with existing process chain Q. For example, proposed segment Q0 of proposed process chain QB shown in FIG. 4A can be an automatic quotation process. Although not shown in FIG. 4A, the quotation process may be a process manually performed in conjunction with existing process chain Q. When the proposed segment Q0 of proposed process chain QB is appended to the existing process chain Q as shown in FIG. 4B, the manually performed quotation process (associated with existing process chain Q) may be replaced by the automatic quotation process implemented in proposed segment Q0.

Figure 4C:
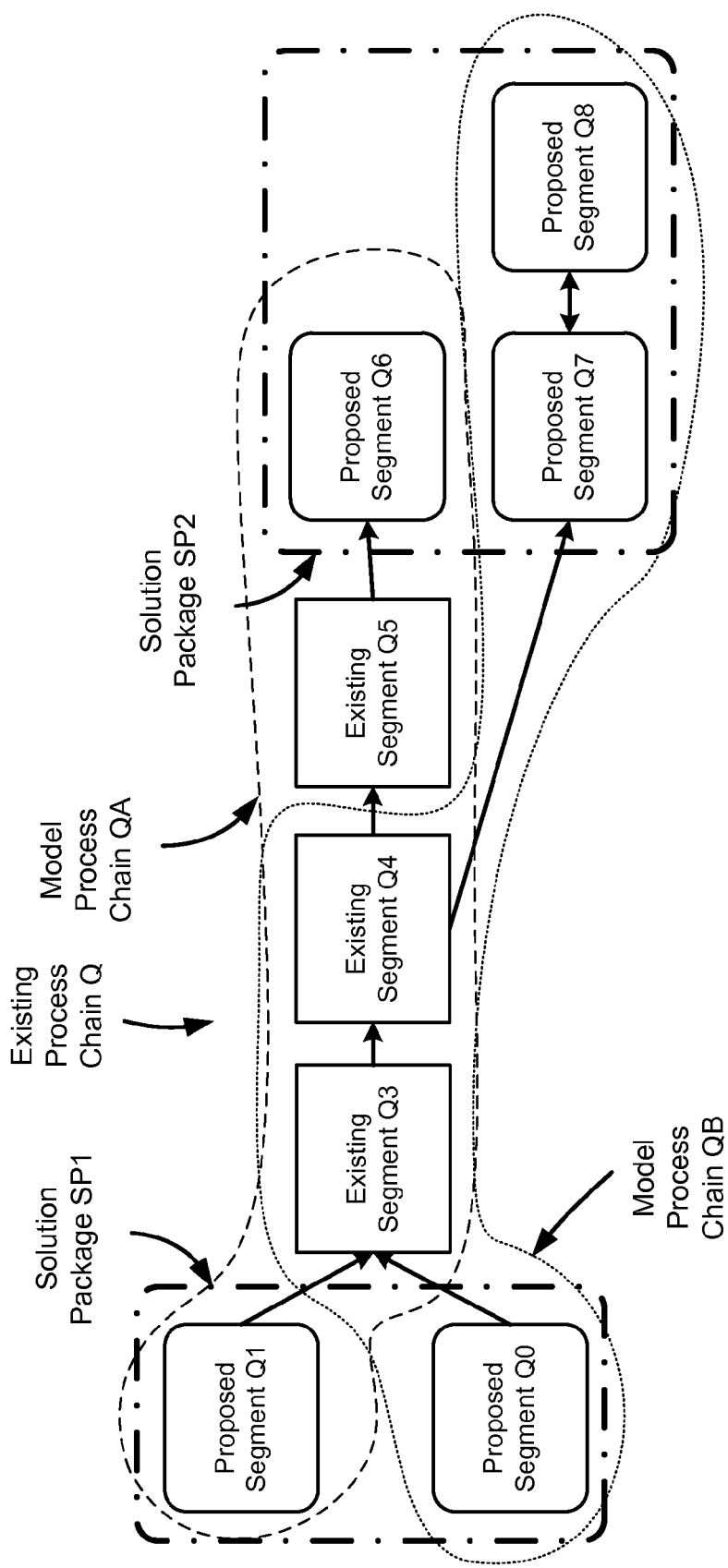
FIG. 4C is a block diagram that illustrates solution packages associated with the process chains shown in FIG. 4B.

FIG. 4C is a block diagram that illustrates solution packages associated with the process chains shown in FIG. 4B. Specifically, FIG. 4C illustrates solution package SP1 and solution package SP2. In this embodiment, both of the solution packages SP1 and SP2 include segments from both of the model process chains QA in QB. For example, solution package SP1 includes proposed segment Q1 from model process chain QA and proposed segment Q0 from model process chain QB.

Although not explicitly shown in FIG. 4C, the solution packages SP1 and/or SP2 can be configured to implement (or facilitate implementation of) at least a portion of the operational relationships between the existing segments and the proposed segments. For example, solution package SP1 can include an interface related to the operational relationship between the existing segment Q5 and the proposed segment Q6. In some embodiments, an interface can be, for example, a software and/or hardware interface that can be used to trigger (e.g., trigger execution of), for example, one or more portions of a segment of a process chain. In some embodiments, the interface can be an application programming interface (API). In some embodiments, the interface can be a process step (e.g., instances of a process step) that can be referred to as a trigger process step or as a triggering process step (e.g., instances of a triggering process step). In some embodiments, data (e.g., one or more parameter values) can be sent and/or received via an interface.

Although not explicitly shown in FIG. 4C, in some embodiments, one or more of the existing segments of the existing process chain Q can be configured to implement (or facilitate implementation of) at least a portion of the operational relationships between the existing segments and the proposed segments. For example, an interface related to the operational relationship between existing segment Q4 and the proposed segment Q7 can be included in (e.g., installed within) existing segment Q4.

In some embodiments, one or more dormant interfaces can be used to implement (or facilitate implementation of) at least a portion of an operational relationship between an existing segment and a proposed segment. For example, a dormant interface included in existing segment Q5 can be activated and used to implement the operational relationship between existing segment Q5 and proposed segment Q6. In some embodiments, an interface (e.g., a dormant interface) already included in (e.g., installed within) one or more of the existing segments can be modified (e.g., upgraded, configuration can be modified) to implement (or facilitate implementation of) at least a portion of the operational relationships between existing segments in the proposed segments.

In some embodiments, an operational relationship between several segments can be implemented using a common interface. For example, the operational relationships between proposed segment Q1 and Q0 and existing segment Q3 can be implemented via a common interface that can be included in solution package SP1 and/or existing segment Q3.

In some embodiments, a solution package different than the solution packages SP1 and SP2 shown in FIG. 4C can be produced. For example, a single solution package including all of the proposed segments having an operational relationship with the existing segments from the existing process chain Q can be produced. In some embodiments, more solution packages than solution package SP1 and SP2 shown in FIG. 4C can be produced based on the proposed segments from model process chain QA and model process chain QB.

Figure 5:
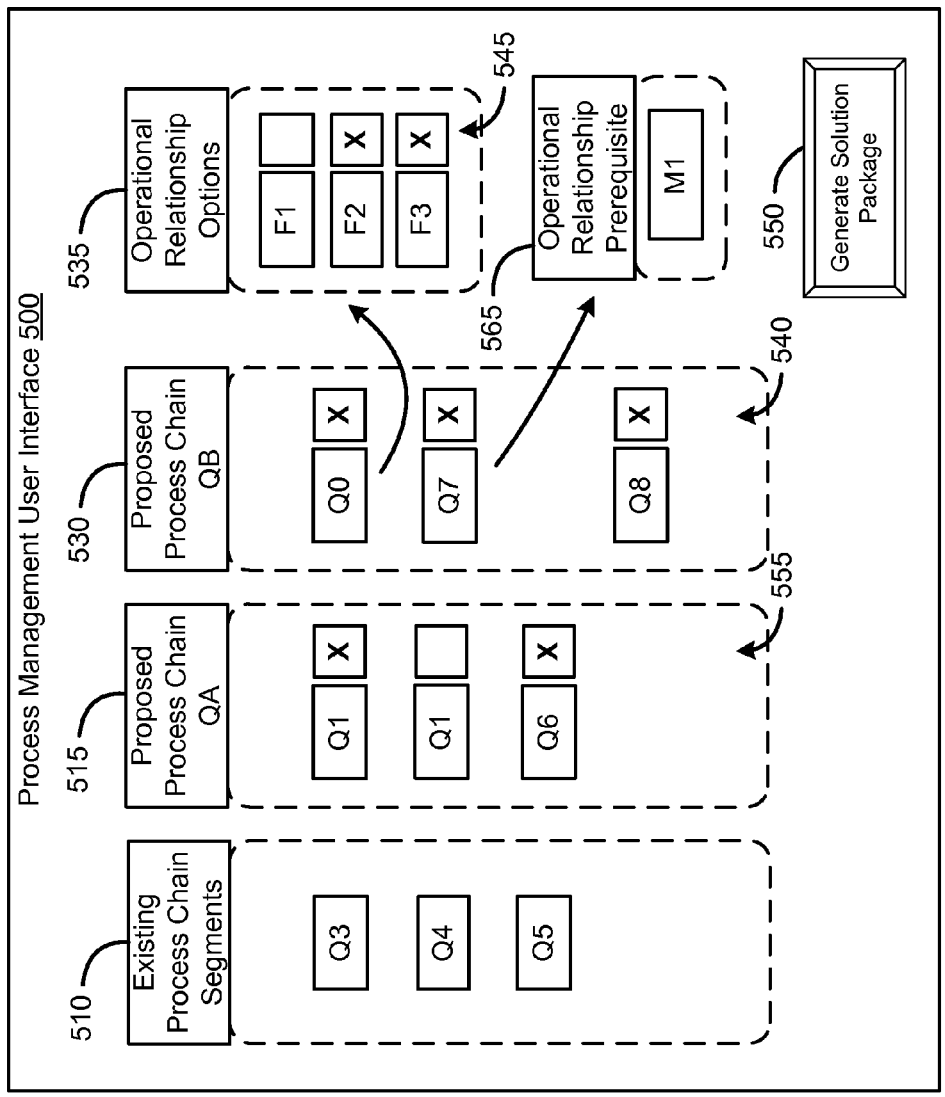
FIG. 5 is a diagram that illustrates a process management user interface associated with a solution package for the existing process chain and the proposed process chains and shown in FIGS. 4A through 4C.

FIG. 5 is a diagram that illustrates a process management user interface 500 associated with a solution package for the existing process chain Q and the proposed process chains QA and QB shown in FIGS. 4A through 4C. The user interface can be used to select and/or review, for example, segments that can have an operational relationship, options for operational relationships, prerequisites for operational relationships, and/or so forth. In some embodiments, the existing process chain Q can be an eligible process chain selected from a set of existing process chains installed on a computer system, and the proposed process chains QA and QB can be selected from a set of proposed process chains based on, for example, one or more solution package conditions.

As shown in FIG. 5, the existing segments of the existing process chain Q are represented in a column associated with "Existing Process Chain Segments" 510. Proposed segments of proposed process chain QA that can be included in a solution package are illustrated in a column associated with "Proposed Process Chain QA" 515. Proposed segments of proposed process chain QB that can be included in a solution package are illustrated in a column associated with "Proposed Process Chain QB" 530.

The placement of proposed segment Q1 to the right of existing segment Q3 represents that the proposed segment Q1 can have an operational relationship with existing segment Q3 and/or existing segment Q4 in a solution package. Similarly, the placement of proposed segment Q0 to the right of existing segment Q3 represents that the proposed segment Q0 can have an operational relationship with existing segment Q3 in a solution package. In some embodiments, the operational relationships can be mandatory operational relationship or optional operational relationships.

Each of segments of the proposed process chains QA and QB shown in FIG. 5 are placed next to a set of selection boxes 540 or selection boxes 550, respectively, that can each be used to select whether or not a solution package should be configured so that one or more of the proposed segments of the proposed process chains QA and QB can operate with one or more of the existing segments of the existing process chain Q. As shown in FIG. 5, the "X" in the selection box (from the set of selection boxes 540) next to proposed process chain Q6 in the "Proposed Process Chain QA" 515 indicates that a solution package, when produced, will enable proposed segment Q1 of proposed process chain QA to operate with existing segment Q3 of existing process chain Q. The absence of a mark in the selection box can represent that proposed segment of the proposed process chain will not operate with an existing segment of the existing process chain in a solution package.

As shown in FIG. 5, operational relationship options F1 through F3, which are included in a column associated with "Operational Relationship Options" 535, can be selected via the selection boxes 545. The operational relationship options F1 through F3 are associated with an operational relationship (e.g., a potential operational relationship) between proposed segment Q0 and existing segment Q3 as represented by the arrow from proposed segment Q0. An operational relationship option can include, for example, an option related to an interface type associated with the operational relationship.

As shown in FIG. 5, an operational relationship prerequisite M1 is shown in a column associated with "Operational Relationship Prerequisite" 565. The operational relationship prerequisite is associated with an operational relationship between proposed segment Q7 and existing segment Q5 as represented by the arrow from proposed segment Q7. An operational relationship prerequisite can include, for example, a requirement to upgrade a proposed segment and/or an existing segment.

The enterprise process user interface 500 also includes a "Generate Solution Package" 550 button. In response to the "Generate Solution Package" 550 button being actuated, a solution package with the selections can be produced by, for example, a solution package generator (such as solution package generator 116 shown in FIG. 1A).

Figure 6A:
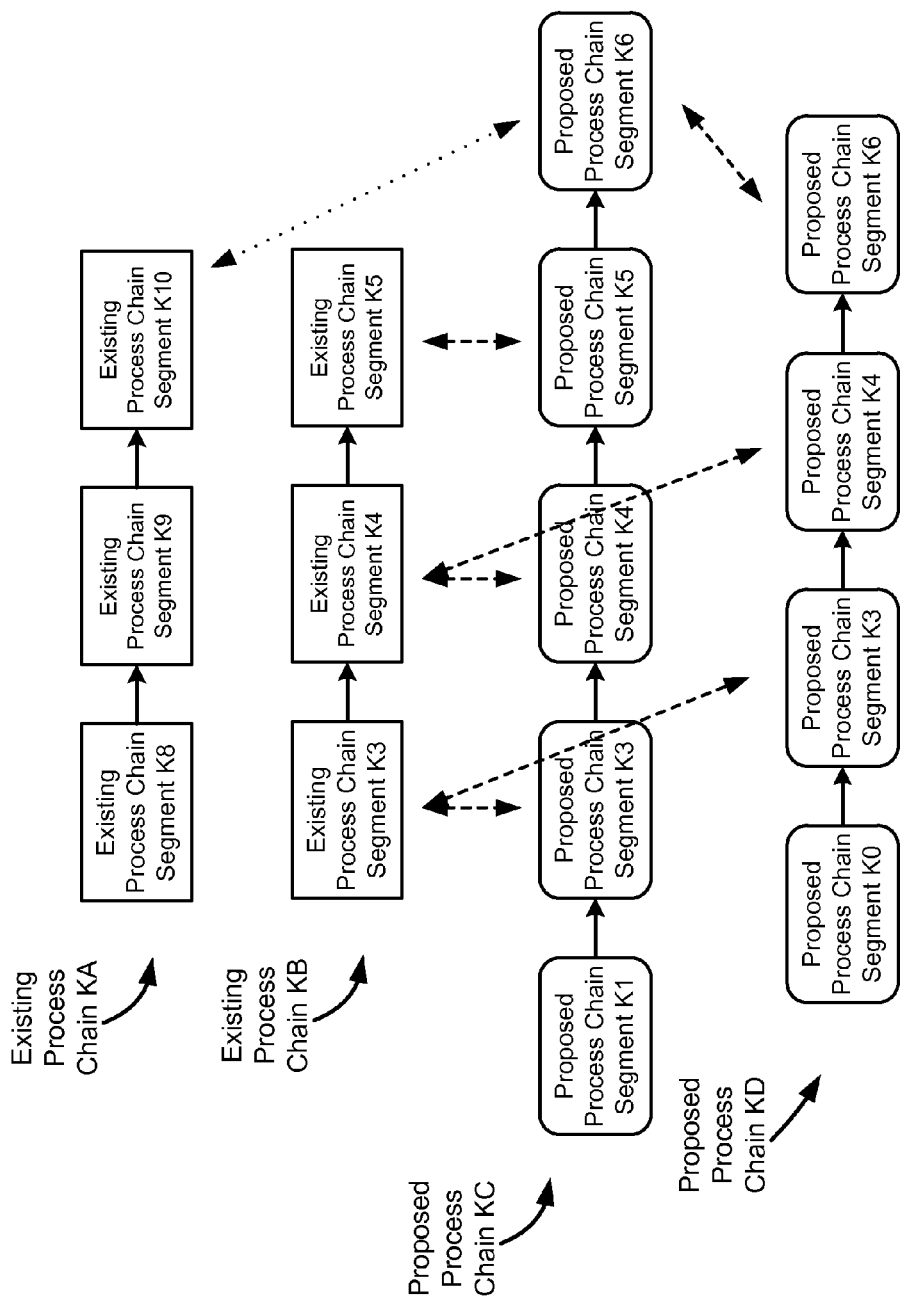
FIG. 6A is block diagram that illustrates existing process chains and several proposed process chains.

FIG. 6A is block diagram that illustrates existing process chains and several proposed process chains. Specifically, existing segments of existing process chains KA and KB are associated with proposed segments of proposed process chain KC and proposed process chain KD. As shown in FIG. 6A, the existing process chain KA includes existing segments K8 through K10, and the existing process chain KB includes existing segments K3 through K5. Proposed process chain KC includes segments K1 and K3 through K6, and proposed process chain KD includes segments K0, K3, K4, and K6. In this embodiment, operational relationships between the segments (e.g., proposed segments, existing segments) are represented by arrows between the segments. In some embodiments, the existing process chain KA, the existing process chain KB, the proposed process chain KC, and/or the proposed process chain KD can be any type of process chain (or portions thereof). For example, the proposed process chain KD can be an engineer-to-order process chain, a sell from stock process chain, a sell from stock consignment process chain, and/or so forth.

As illustrated by the dashed arrows shown in FIG. 6A, proposed segments K3 through K5 of the proposed process chain KC correspond with the existing segments K3 through K5, respectively, of the existing process chain KB. Proposed segments K3 and K4 of the proposed process chain KD correspond with the existing segments K3 and K4, respectively, of the existing process chain KB. Also, proposed segment K6 of the proposed process chain KC corresponds with the proposed segment K6 of the proposed process chain KD. As illustrated by the dotted double-sided arrow, the existing process chain KA is eligible (e.g., eligible for operation) because the existing segment K10 of the existing process chain KA can have an operational relationship with proposed segment K6 which is common to both proposed process chain KC and proposed process chain KD. In other words, an instance of proposed segment K6 is associated with proposed process chain KC and proposed process chain KD.

Figure 6B:
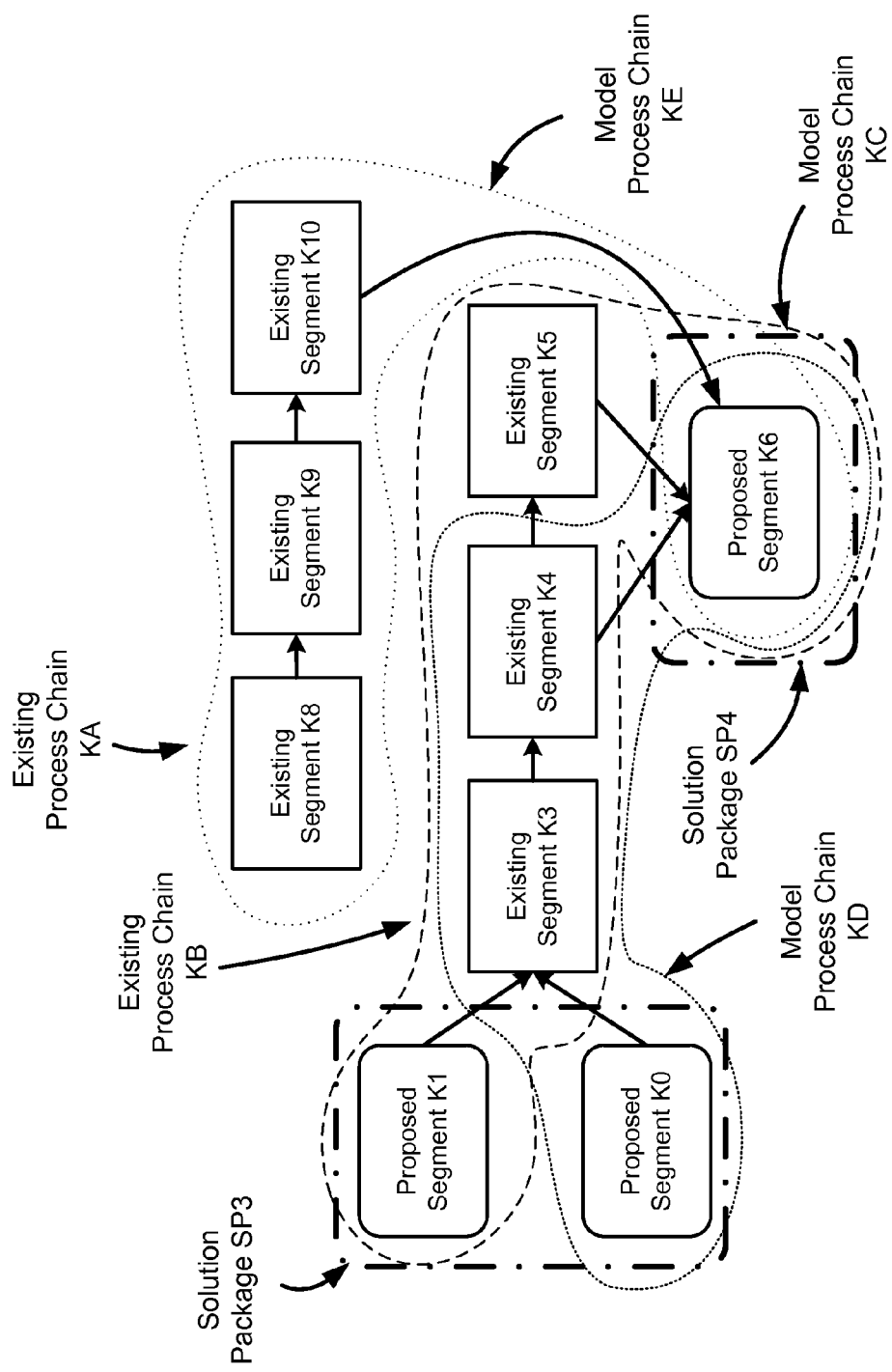
FIG. 6B is a block diagram that illustrates a combination of the existing process chains and the proposed process chains shown in FIG. 6A.

The FIG. 6B is a block diagram that illustrates a combination of the existing process chains and the proposed process chains shown in FIG. 6A. As shown in FIG. 6B, several of the proposed segments of the proposed process chains KC and KD are appended to the existing segments of the existing process chains KA and KB. As shown in FIG. 6B, the proposed segments K1 and K6 of the proposed process chain KC (shown in FIG. 6A) are appended to the existing process chain KB to define model process chain KC, which corresponds with proposed process chain KC (shown in FIG. 6A). Also, the proposed segments K0 and K6 of the proposed process chain KD (shown in FIG. 6A) are appended to the existing process chain KB to define model process chain KD, which corresponds with proposed process chain KD (shown in FIG. 6A). The proposed segment K6 is appended to existing process chain KA to define model process chain KE.

As shown in FIG. 6B, the proposed segments K0 and K1 (which were included in the proposed process chains KD and KC, respectively) are included in solution package SP3. The proposed segment K0 and the proposed segment K1 each have an operational relationship with a common existing segment—existing segment K3.

As shown in FIG. 6B, the proposed segment K6 (which was included in both of the proposed process chains KC and KD) is included in solution package SP4. The proposed segment K6, when included in solution package SP4, has an operational relationship with several of the existing segments. Specifically, proposed segment K6 has an operational relationship with the existing segment K10 of the existing process chain KA and has an operational relationship with existing segments K4 and K5 of the existing process chain KB. As shown in FIG. 6B, solution package SP4 is associated with (e.g., defines a portion of) three different model process chains—model process chains KC, KD, and KE. In this embodiment, the model process chain KE is an entirely new process chain that does not correspond with any of the existing process chains or proposed process chains shown in FIG. 6A.

In some embodiments, the model process chains KC, KD, and KE, with options and/or prerequisites related to operational relationships, can be defined by a proposed process chain module (e.g., proposed process chain module 114 shown in FIG. 1A). In some embodiments, the model process chains KC, KD, and KE with options and/or prerequisites related to operational relationships, can be presented to a user via a user interface defined by a user interface module (e.g., user interface module 118 shown in FIG. 1A). In some embodiments, a solution package different than the solution packages SP3 and SP4 shown in FIG. 6B can be produced.

Figure 7A:
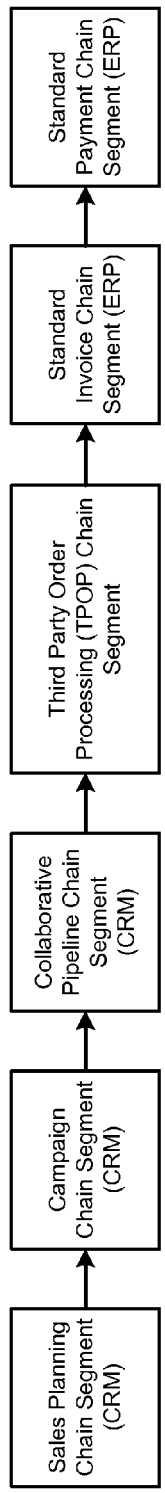
FIG. 7A is a block diagram that illustrates an end-to-end process chain.

FIG. 7A is a block diagram that illustrates an end-to-end process chain. The end-to-end process chain is a sell from stock end-to-end process chain that includes a sales planning chain segment, a campaign chain segment, a collaborative pipeline chain segment, third-party order processing chain segment, a standard invoice chain segment, and a standard payment chain segment. The first three chain segments of this end-to-end process chain are related to customer relation management (CRM) and the last two chain segments of this end-to-end process chain are related to enterprise resource planning (ERP). In some embodiments, any portion of the end-to-end process chain can be implemented in software and/or hardware.

Figure 7B:
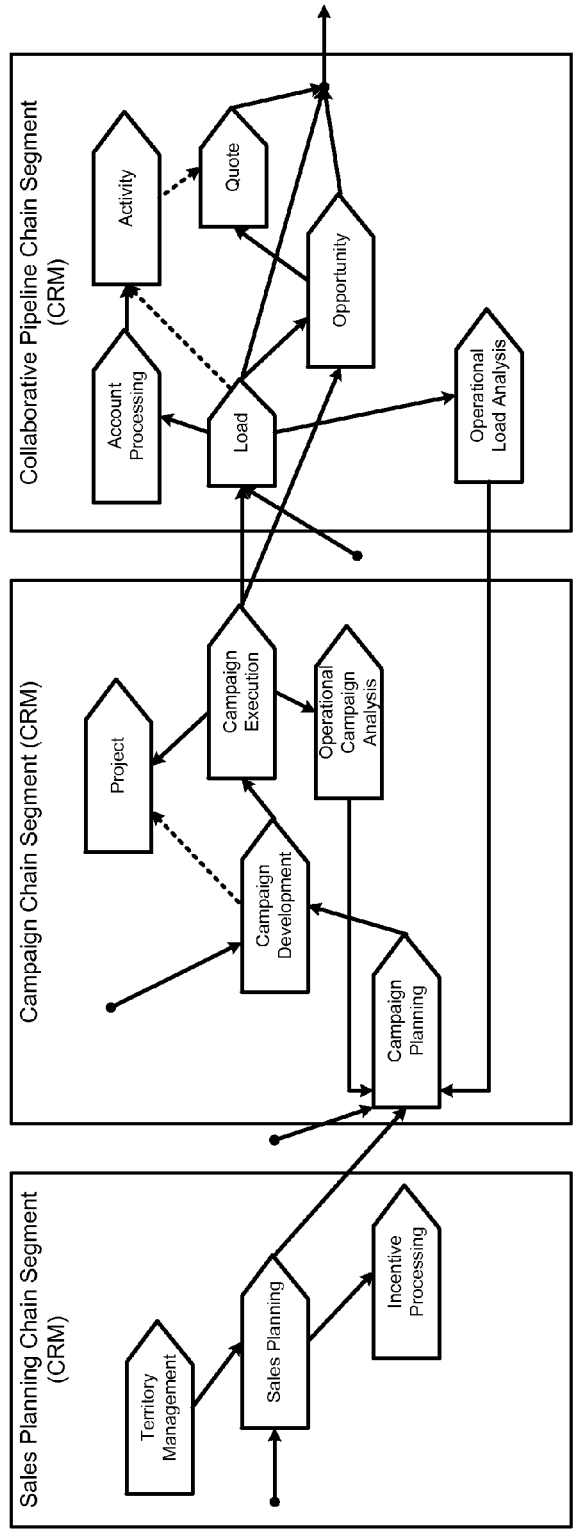
FIG. 7B is a block diagram that illustrates details of some of the chain segments shown in FIG. 7A.

FIG. 7B is a block diagram that illustrates details of some of the chain segments shown in FIG. 7A. Specifically, FIG. 7B includes details related to enterprise processes included in each of the sales planning chain segment, the campaign chain segment, and a collaborative pipeline chain segment. The enterprise processes are represented by arrow boxes. In this embodiment, operational relationships between the enterprise processes are represented by arrows. The dashed arrows between some of the enterprise processes represent optional operational relationships.

The arrows with dotted ends represent entry points to or from an application. In some embodiments, the entry points can be an entry points through which one or more portions of the enterprise process is triggered and/or through which data can be passed to the enterprise process. In some embodiments, the entry points can function as an interface (e.g., an external interface). In some embodiments, an external application (e.g., a third-party application) that is separate from an application (e.g., internal application) used to implement the chain segments can interface with one or more of the enterprise processes via an entry point. For example, the campaign development enterprise process included in the campaign chain segment can be triggered by a third-party application (different from an application or platform of the enterprise processes) via the entry point. In some embodiments, a solution package can be configured to interface with one or more of the enterprise processes via an entry point.

In some embodiments, each of the enterprise processes included in FIG. 7B can include one or more process steps. A generalized example of an enterprise process with optional process steps and mandatory process steps is described in connection with FIG. 8.

Figure 8:
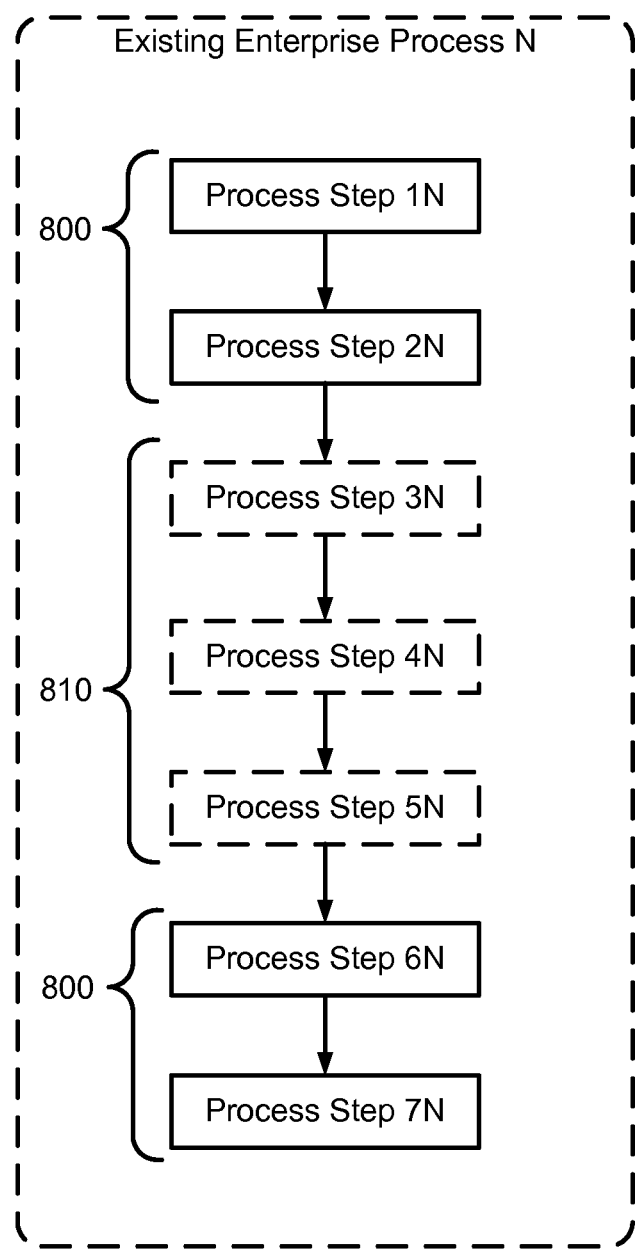
FIG. 8 is a block diagram that illustrates an enterprise process that includes mandatory process steps and optional process steps.

FIG. 8 is a block diagram that illustrates an enterprise process N that includes mandatory process steps 800 and optional process steps 810. The mandatory process steps 800, which include process steps 1N, 2N, 6N, and 7N, define the core functionality of the enterprise process, and process steps 3N, 4N, and 5N are optional process steps 810. In some embodiments, at least some of the process steps of the enterprise process N can be configured to trigger a proposed process chain that can be included in a solution package.

A flow of information between the process steps of enterprise process N is represented by arrows. For example, optional process step 3N is related to mandatory process step 2N based on a function associated with the optional process step 3N being configured to process information (e.g., data) produced by a function of the mandatory process step 2N. Similarly, optional process step 5N is related to mandatory process step 6N based on a function associated with the optional process step 5N being configured to send information (e.g., data) to a function of the mandatory process step 6N.

Each of the process steps from the enterprise process N can be referred to by their classification as a mandatory process step 800 or as an optional process step 810 (which are types of process steps). For example, process step 3N, which is an optional process step 810 and can be referred to as optional process step 3N.

In this embodiment, the mandatory process steps 800 are represented by rectangles with solid lines. In other words, representations of the mandatory process steps 800 include rectangles with solid lines. Also, the optional process steps 810 are represented by rectangles with dashed lines. In other words, representations of the optional process steps 810 include rectangles with dashed lines.

Various combinations of the optional process steps 810 can be combined with (e.g., bound to) the mandatory process steps 800 to define variants of the enterprise process N. For example, process step 3N can be combined with the mandatory process steps 800 to define a first variant of the enterprise process N, and process steps 4N and 5N can be combined with the mandatory process steps 800 to define a second variant of the enterprise process. A variant of the enterprise process N that includes only the mandatory process steps 800 can be referred to as standard enterprise process N. These variants of the enterprise process N are not shown in FIG. 8.

In some embodiments, the optional process steps 810 can be dependent from the mandatory process steps 800, but not dependent from other optional process steps 810. For example, in some embodiments, a variant of the enterprise process N must include all of the mandatory process steps 800, but can include only a subset of the optional process steps 810. In other words, a variant of the enterprise process N can include all of the mandatory process steps 800 and only, for example, process step 5N. This variant of the enterprise process be can be operational without the preceding optional process steps—process step 3N and process step 4N.

The process steps shown in enterprise process N can represent process steps within an enterprise process. For example, the process steps of the enterprise process N can be representations of the process steps of a sales order processing enterprise process. Accordingly, mandatory process step 1N can represent a main process step related to creation, updating, rejecting a sales order, etc., and mandatory process step 2N can represent a process step related to an availability to purchase, promise, check, and/or update. Optional process step 3N can represent an optional credit check process step, optional process step 4N can represent an optional advertising campaign determination step, and optional process step 5N can represent an optional managerial accounting/auditing process step. Mandatory process step 6N can represent a mandatory purchase order request process step, and mandatory process step 8B can represent a mandatory delivery creation process step.

In some embodiments, one or more of the process steps shown in existing enterprise N can be configured to function as a background process that is not visible. In other words, the process step may neither require an input value from a user nor produce a result that may be visible to a user via, for example, a user interface. In some embodiments, one or more of the process steps shown in existing enterprise N may require user input in order for the process step to be executed. For example, a process step from enterprise process N may require an input value (from a user) so that one or more functions of the process step can be performed. In some embodiments, one or more of the process steps shown in enterprise process N can be configured to produce a result that may be visible to a user via, for example, a user interface. For example, a process step from the enterprise process N can be a process step that can produce a result that can be presented to a user via a user interface (e.g., a notification via the user interface). As a specific example, if the process step is a process step related to a credit check, the result may be a credit score associated with a user of the enterprise process N. Although not shown in FIG. 8, a proposed process chain can be, or can include, one or more process steps similar to those included in enterprise process N.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method including executing instructions recorded on a non-transitory computer-readable storage media using at least one processor, the method comprising:
  receiving a plurality of segment definitions representing a plurality of existing segments defining an existing process chain implemented in a target system;

selecting, based on the plurality of segment definitions, a first proposed process chain including a first proposed segment corresponding with an existing segment from the plurality of existing segments, and including a second proposed segment different from each existing segment from the plurality of existing segments;

selecting, based on the plurality of segment definitions, a second proposed process chain including a third proposed segment corresponding with the existing segment from the plurality of existing segments, and including a fourth proposed segment different from each existing segment from the plurality of existing segments, wherein the first, second, third, and fourth proposed segments are distinct;

defining an option for an operational relationship between the existing segment from the plurality of existing segments and the second proposed segment of the first proposed process chain; and defining a prerequisite for an operational relationship between the existing segment from the plurality of existing segments and the fourth proposed segment of the second proposed process chain.

2. The method of claim 1, wherein the first proposed process chain and the second proposed process each define an end-to-end process chain that is a superset of the plurality of existing segments defining the existing process chain.

3. A computer system including instructions stored on a non-transitory computer-readable storage medium, the computer system comprising:

an existing process chain module configured to receive a plurality of segment definitions representing a plurality of existing segments defining an existing process chain implemented in a target system;

a proposed process chain module configured to:

select, based on the plurality of segment definitions, a first proposed process chain including a first proposed segment corresponding with an existing segment from the plurality of existing segments, and including a second proposed segment different from each existing segment from the plurality of existing segments, and select, based on the plurality of segment definitions, a second proposed process chain including a third proposed segment corresponding with the existing segment from the plurality of existing segments, and including a fourth proposed segment different from each existing segment from the plurality of existing segments, wherein the first, second, third, and fourth proposed segments are distinct; and an operational relationship module configured to define an option for an operational relationship between the existing segment from the plurality of existing segments and the second proposed segment of the first proposed process chain, and define a prerequisite for an operational relationship between the existing segment from the plurality of existing segments and the fourth proposed segment of the second proposed process chain.

4. The computer system of claim 3, wherein the first proposed process chain and the second proposed process each define an end-to-end process chain that is a superset of the plurality of existing segments defining the existing process chain.

5. The computer system of claim 3, wherein the option is related to an interface configured to trigger at least a portion of the second proposed segment of the second proposed process chain, the interface is included in at least one of the second proposed segment of the second proposed process chain or the existing segment from the plurality of existing segments.

6. The computer system of claim 3, further comprising: a solution package generator configured to receive an indicator that the option has been selected for the operational relationship between the existing segment from the plurality of existing segments and the second proposed segment of the first proposed process chain, and configured to produce a solution package that includes an implementation of the third proposed segment of the first proposed process chain, an implementation of the fourth proposed segment of the second proposed process chain, and excludes the plurality of existing segments defining the existing process chain.

7. The computer system of claim 3, wherein the prerequisite is related to an upgrade to a program version of the existing segment from the plurality of existing segments of the existing process chain, the upgrade to the program version corresponds with a program version of the fourth proposed segment of the second proposed process chain.

8. The computer system of claim 3, wherein the second proposed segment of the first proposed process chain includes a process step configured to trigger a first process step included in the existing segment from the plurality of existing segments defining the existing process chain, the existing segment from the plurality of existing segments includes a second process step configured to trigger a process step included in the fourth proposed segment of the second proposed process chain.

9. The computer system of claim 3, wherein at least a portion of the plurality of existing segments including the existing segment and at least a portion of the first proposed process chain including the first proposed segment collectively define an end-to-end process that is different than an end-to-end process collectively defined by the at least the portion of the plurality of existing segments including the existing segment and at least a portion of the second proposed process chain including the fourth proposed segment.

10. The computer system of claim 3, wherein each of the existing segments from the plurality of existing segments is included in a first end-to-end process chain associated with the first proposed process chain and included in a second end-to-end process chain associated with the second proposed process chain.

11. The computer system of claim 3, further comprising:

a solution package generator configured to produce a solution package that includes an interface common to the operational relationship between the existing segment from the plurality of existing segments and the second proposed segment of the first proposed process chain, and to the operational relationship between the existing segment from the plurality of existing segments and the fourth proposed segment of the second proposed process chain.

12. The computer system of claim 3, wherein the existing segment from the plurality of segments includes an enterprise process with an external interface to an external application independent from an application implementing the existing process chain, the first proposed process chain, and the second proposed process chain.

13. The computer system of claim 3, wherein the segment from the plurality of segments includes a variant of an existing enterprise process including an optional process step bound to a mandatory process step.

14. The computer system of claim 3, wherein a combination of the second proposed segment of the first proposed process chain and the existing segment collectively define at least a portion of a first model process chain, and a combination of the fourth proposed segment of the second proposed process chain and the existing segment collectively define at least a portion of a second model process chain, the computer system further comprising:

a solution package generator configured to produce a single solution package for the first model process chain and the second model process chain.

15. The computer system of claim 3, wherein a combination of the second proposed segment of the first proposed process chain and the existing segment collectively define at least a portion of a first model process chain, and a combination of the fourth proposed segment of the second proposed process chain and the existing segment collectively define at least a portion of a second model process chain, the existing segment is common to the first model process chain and the second model process chain.

16. The computer system of claim 3, wherein the plurality of existing segments is a first plurality of existing segments, the existing process chain module is configured to select a second plurality of existing segments defining an existing process chain different from the existing process chain defined by the first plurality of existing segments, the computer system further comprising:

a solution package generator configured to produce a solution package that includes an implementation of the second proposed segment of the first proposed process chain, an implementation of the fourth proposed segment of the second proposed process chain, and an implementation of a proposed segment of a third proposed process chain that has an operational relationship with the second plurality of existing segments, but does not have an operational relationship with the first plurality of existing segments.

17. A non-transitory computer-readable storage medium storing code representing instructions that when executed are configured to cause a processor to perform a process, the code comprising code to:

receive a plurality of segment definitions representing a plurality of existing segments defining an existing process chain implemented in a target system;

select, based on the plurality of segment definitions, a first proposed process chain including a first proposed segment corresponding with an existing segment from the plurality of existing segments, and including a second proposed segment different from each existing segment from the plurality of existing segments;

select, based on the plurality of segment definitions, a second proposed process chain including a third proposed segment corresponding with the existing segment from the plurality of existing segments, and including a fourth proposed segment different from each existing segment from the plurality of existing segments, wherein the first, second, third, and fourth proposed segments are distinct;

define an option for an operational relationship between the existing segment from the plurality of existing segments and the second proposed segment of the first proposed process chain; and define a prerequisite for an operational relationship between the existing segment from the plurality of existing segments and the fourth proposed segment of the second proposed process chain.

18. The non-transitory computer-readable storage medium of claim 17, wherein the first proposed process chain and the second proposed process each define an end-to-end process chain that is a superset of the plurality of existing segments defining the existing process chain.

19. The non-transitory computer-readable storage medium of claim 17, wherein the option is related to an interface configured to trigger at least a portion of the fourth proposed segment of the second proposed process chain, the interface is included in at least one of the fourth proposed segment of the second proposed process chain or the existing segment from the plurality of existing segments.

20. The non-transitory computer-readable storage medium of claim 17, further comprising code to:

receive an indicator that the option has been selected for the operational relationship between the existing segment from the plurality of existing segments and the second proposed segment of the first proposed process chain; and produce a solution package that includes an implementation of the second proposed segment of the first proposed process chain, an implementation of the fourth proposed segment of the second proposed process chain, and excludes the plurality of existing segments defining the existing process chain.

* * * * *